(12) United States Patent
Ramanujam et al.

(10) Patent No.: US 8,977,304 B2
(45) Date of Patent: Mar. 10, 2015

(54) SYSTEMS AND METHODS FOR PRIORITIZING MESSAGES ON A MOBILE DEVICE

(75) Inventors: Srivatsan Ramanujam, San Carlos, CA (US); Paul Vincent O'Rorke, La Honda, CA (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/823,302

(22) PCT Filed: Apr. 27, 2012

(86) PCT No.: PCT/US2012/035509
§ 371 (c)(1),
(2), (4) Date: Mar. 14, 2013

(87) PCT Pub. No.: WO2013/162600
PCT Pub. Date: Oct. 31, 2013

(65) Prior Publication Data
US 2013/0288722 A1  Oct. 31, 2013

(51) Int. Cl.
*H04W 4/00* (2009.01)
*H04W 4/14* (2009.01)
*G06Q 10/10* (2012.01)
*H04M 1/725* (2006.01)
*H04L 12/58* (2006.01)
*H04W 4/20* (2009.01)

(52) U.S. Cl.
CPC .............. *H04W 4/14* (2013.01); *G06Q 10/107* (2013.01); *H04M 1/72552* (2013.01); *H04L 51/12* (2013.01); *H04L 51/24* (2013.01); *H04W 4/206* (2013.01)

USPC ................. 455/466; 455/414.1; 455/412.1; 455/418

(58) Field of Classification Search
None
See application file for complete search history.

(56) References Cited

U.S. PATENT DOCUMENTS

| 6,147,977 A * | 11/2000 | Thro et al. ................. 370/265 |
| 2004/0030753 A1 | 2/2004 | Horvitz |
| 2008/0037554 A1* | 2/2008 | Vincent et al. ........ 370/395.42 |

FOREIGN PATENT DOCUMENTS

| WO | 01/69432 A2 | 9/2001 |
| WO | 2004/030296 A1 | 4/2004 |

OTHER PUBLICATIONS

International Search Report and Written Opinion dated Aug. 1, 2012 issued in corresponding PCT application No. PCT/IB2012/035509, 13 pages.

* cited by examiner

*Primary Examiner* — Erika A Washington
(74) *Attorney, Agent, or Firm* — Snyder, Clark, Lesch & Chung, LLP

(57) ABSTRACT

A method, performed by a mobile communication device, may include receiving a message; extracting one or more features associated with the message; and determining a priority level for the message, based on the extracted one or more features, using a model that relates the extracted one or more features to an expected response time for the message. The method may further include determining a context associated with the user of the mobile communication device; modifying the priority level based on the determined context; and providing the message to a list of messages based on the modified priority level. Additionally, the user may be provided with a notification tone associated with the modified priority level.

19 Claims, 20 Drawing Sheets

1401 ⟶

1410000038      1410
11:03 11/Jan/2012              1412
FRM: noreply@txt2day^PER.com
                        1414
SUBJ: Sent by Jacob
MSG: Hey, we are going to lunch at Palo Alto^LOC,
with Joseph^PER Join us at 11:30 am ^TIM 1410000037
11:15 11/Jan/2012
FRM: Archie^PER        1416
SUBJ: Climbing^ACT
MSG: Hey, let's go climbing^ACT @ PG^LOC in
Sunnyvale^LOC 1410000036
12:18 11/Jan/2012
FRM: Lilly^PER
SUBJ:
MSG: Hey how are you? ☺

1410000035
1:34 11/Jan/2012
FRM: Shaun^PER
SUBJ: movie^ACT              1418
MSG: Dude^PER, we're heading out to watch that
movie^ACT. heard it is mindblowing! Text me back
if you want us to get you tickets^OBJ.

1410000038
11:03 11/Jan/2012
FRM: noreply@txt2day.com
SUBJ: Sent by Jacob
MSG: Hey$^{INJ}$, we$^{PRN}$ are$^{VBP}$ going$^{VBG}$ to$^{TO}$ lunch$^{NN}$ at$^{PRP}$ Palo$^{NNP}$ Alto$^{NNP}$, with$^{CON}$ Joseph$^{NNP}$ Join$^{VBP}$ us$^{PRN}$ at$^{PRP}$ 11:30$^{CD}$ am $^{NN}$ 1410000037
11:15 11/Jan/2012
FRM: Archie    1430
SUBJ: Climbing
MSG: Hey$^{INJ}$, let's$^{VBP}$ go$^{VBP}$ climbing$^{VBG}$ @$^{PRP}$ PG$^{NNP}$ in$^{PRP}$ Sunnyvale$^{NNP}$ 1410000036
12:18 11/Jan/2012
FRM: Lilly$^{PER}$
SUBJ:
MSG: Hey$^{INJ}$ how$^{ADV}$ are$^{VBP}$ you$^{PRN}$? ☺

1410000035
1:34 11/Jan/2012
FRM: Shaun
SUBJ: movie
MSG: Dude$^{NNP}$, we$^{PRN}$'re$^{VBP}$ heading$^{VBG}$ out$^{PRP}$ to$^{TO}$ watch$^{VBP}$ that$^{ADJ}$ movie$^{NN}$. heard$^{VBP}$ it$^{PRN}$ is$^{VBP}$ mindblowing!$^{ADJ}$ Text$^{VBP}$ me$^{PRN}$ back$^{NN}$ if$^{PRP}$ you$^{PRN}$ want$^{VBP}$ us$^{PRN}$ to$^{TO}$ get$^{VBP}$ you$^{PRN}$ tickets$^{NN}$.

FIG. 14B

SYSTEMS AND METHODS FOR PRIORITIZING MESSAGES ON A MOBILE DEVICE

BACKGROUND INFORMATION

A user of a mobile communication device may use the mobile communication device to send or receive messages, such as, for example Short Message Format (SMS) messages (also known as text messages), emails, updates from a social network, such as Twitter, LinkedIn, Facebook, and/or other types of messages. A user may receive a large number of messages over the course of the day and the large number of messages may be overwhelming. Furthermore, a user may receive a notification whenever a message is received by the mobile communication device, causing the user to respond to the notification even when the user is busy or when the message is not important. Dealing with a large number of messages or message notifications may be overwhelming.

SUMMARY OF THE INVENTION

According to one aspect, a method, performed by a computing device, may include extracting, by the computing device, one or more features from messages received by a mobile communication device; obtaining, by the computer device, information about a user context associated with a user of the mobile communication device; obtaining, by the computer device, information about one or more user actions associated with the messages, wherein the information includes information about a response time associated with a particular message, wherein the response time corresponds to an amount of time between when the user received the particular message and when the user responded to the particular message; generating, by the computer device, a priority function that relates a particular response time to a particular priority level; generating, by the computer device, a model associated with the user, wherein the model relates the extracted one or more features to a priority level based on the obtained information about the one or more user actions, based on the obtained information about the user context, and based on the generated priority function; and using, by the computer device, the generated model to determine a priority level for a message received by the mobile communication device.

Additionally, the extracted one or more features may include information about a contact associated with a particular message.

Additionally, the extracted one or more features may include information about a content included in a particular message.

Additionally, the information about the content included in the particular message may include one or more of information about parts of speech included in the particular message, information about named entities included in the particular message, information about particular characters included in the particular message, or information about a header associated with the particular message.

Additionally, the information about one or more user actions associated with the messages may further include one or more of information about how long the user has viewed a particular message, information about whether the user has deleted the particular message, information about whether the user has labeled the particular message with the particular label, or information about whether the user has moved the particular message to a particular folder.

Additionally, the method may further include determining a mean response time for the messages; associating a medium priority level, for the priority function, with response times within a standard deviation of the mean response time; associating a high priority level, for the priority function, with response times lower than the response times within the standard deviation of the mean response time; and associating a low priority level, for the priority function, with response times more than the response times within the standard deviation of the mean response time.

Additionally, the information about the user context associated with the messages may include one or more of information about whether the mobile communication device is in a location associated with the user's work location, information about whether the mobile communication device is in a location associated with the user's home location, information about whether the mobile communication device is associated with information about whether the mobile communication device is associated with continuous motion, or information about whether the mobile communication device is associated with stop-and-go motion.

Additionally, generating the model associated with the user may include one or more of generating a linear regression model, generating a Support Vector Machines model, generating a least median squares regression model, or generating a k-nearest neighbor regression model.

Additionally, generating the model associated with the user may include generating at least two models, and the method may further include combining the at least two models into an ensemble model by weighted averaging the two models.

Additionally, the messages may include one or more of a short message format message, an instant message, a telephone message, an email message, or a social media feed.

Additionally, generating the model associated with the user may include generating a first model for a first type of message using the first type of messages received by the mobile communication device; generating a second model for a second type of message based on the generated first model; and using the generated second model to determine a priority level for a particular second type of message received by the mobile communication device.

According to another aspect, a method performed by a mobile communication device, may include receiving, by the mobile communication device, a message; extracting, by the mobile communication device, one or more features associated with the message; determining, by the mobile communication device, a priority level for the message, based on the extracted one or more features, using a model that relates the extracted one or more features to an expected response time for the message; determining, by the mobile communication device, a context associated with a user of the mobile communication device; modifying, by the mobile communication device, the priority level based on the determined context; and providing, by the mobile communication device, the message to a list of messages based on the modified priority level.

Additionally, one or more features associated with the message may include one or more of information about a contact associated with the message, information about parts of speech included in the message, information about named entities included in the message, information about particular characters included in the message, information about a header associated with the message, or information about when the message was received.

Additionally, the method may further include selecting a time profile for the message based on the extracted one or more features; and changing the priority level over time based on the selected time profile.

Additionally, the time profile may be based on an exponentially decaying function.

Additionally, one of the extracted one or more features may correspond to a named entity of a time type, wherein the named entity of the time type specifies a particular time, and wherein the time profile includes a time profile that includes an increasing priority level until the particular time and a decreasing priority level after the particular time.

Additionally, the method may further include determining a particular notification for the message based on the determined priority level and based on the determined context; determining whether to provide the particular notification based on the determined context; and providing the particular notification via an output device of the mobile communication device, in response to determining that the particular notification is to be provided.

Additionally, the method may further include receiving, from the user, a selection of a speed and privacy setting for determining priority levels for messages; and selecting one or more of the extracted one or more features to send to a prioritization server device, to determine the priority level for the message, based on the received selection of the privacy and speed setting.

Additionally, the method may further include receiving, from the user, a selection of a criterion to use to organize different types of messages, wherein the criterion includes at least one of organizing the different types of messages based on contacts associated with the different types of messages, organizing the different types of messages based on a type of message associated with the different types of messages, or combining the different types of messages into a single list.

Additionally, the message may include a short message format message, an instant message, a telephone message, an email message, or a social media feed.

According to yet another aspect, a mobile communication device may include logic configured to receive a message; extract one or more features associated with the message; determine a priority level for the message, based on the extracted one or more features, using a model that relates the extracted one or more features to an expected response time for the message; determine a context associated with a user of the mobile communication device; modify the priority level based on the determined context; and include the message in a list of messages based on the modified priority level.

Additionally, the logic may be further configured to determine whether a feature associated with the message is associated with the determined context; and lower the priority level in response to determining that the feature associated with the message is not associated with the determined context.

Additionally, the logic may be further configured to select a time profile for the message based on the extracted one or more features; and change the priority level over time based on the selected time profile.

Additionally, the logic may be further configured to determine a particular notification for the message based on the determined priority level and based on the determined context; determine whether to provide the particular notification based on the determined context; and provide the particular notification via an output device of the mobile communication device, in response to determining that the particular notification is to be provided.

Additionally, the logic may be further configured to receive, from the user, a selection of a speed and privacy setting for determining priority levels for messages; and select one or more of the extracted one or more features to send to a prioritization server device, to determine the priority level for the message, based on the received selection of the privacy and speed setting.

Additionally, the logic may be further configured to receive, from the user, a selection of a criterion to use to organize different types of messages, wherein the criterion includes at least one of organizing the different types of messages based on contacts associated with the different types of messages, organizing the different types of messages based on a type of message associated with the different types of messages, or combining the different types of messages into a single list.

BRIEF DESCRIPTION OF THE DRAWINGS

FIG. 14A is a diagram of exemplary messages tagged with a named entity recognizer according to an implementation described herein;

FIG. 14B is a diagram of exemplary messages tagged with a parts of speech tagger according to an implementation described herein.

DETAILED DESCRIPTION OF PREFERRED EMBODIMENTS

Figure 1:
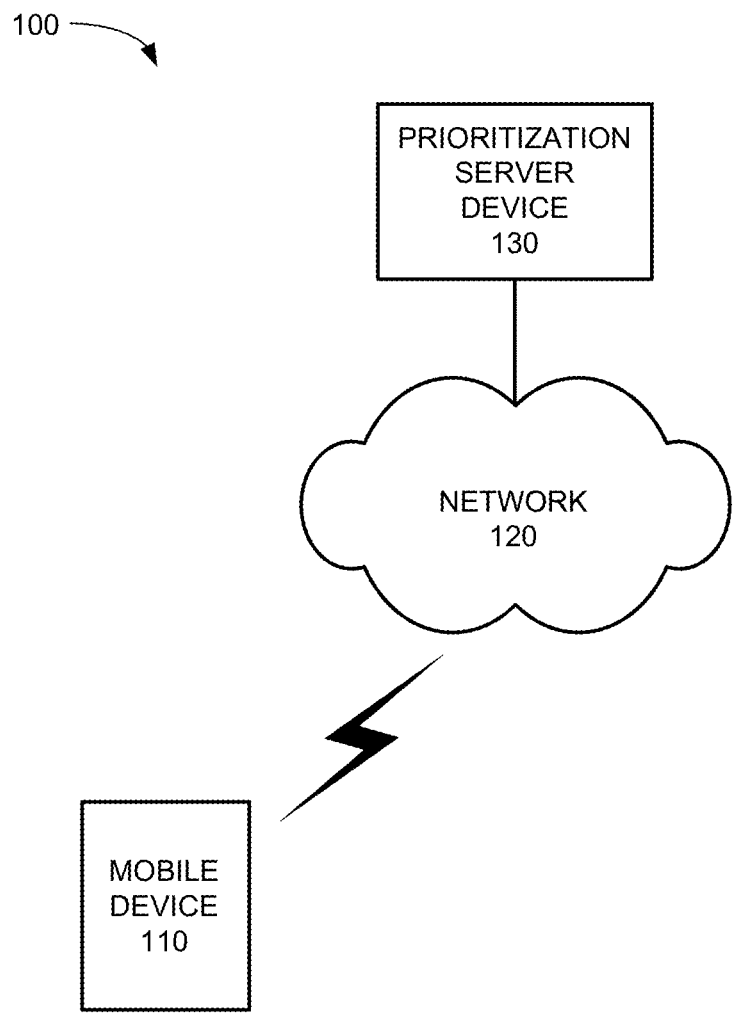
FIG. 1 is a diagram illustrating an exemplary environment according to an implementation described herein.

The following detailed description refers to the accompanying drawings. The same reference numbers in different drawings identify the same or similar elements.

An implementation described herein may relate to prioritizing messages received by a mobile communication device. A model, which relates one or more features extracted from messages, received by a user of a mobile communication device, to particular priority levels, may be generated for a user. Messages received by the mobile communication device may be processed to extract one or more features from the messages. Moreover, a context associated with the user may be determined based on, for example, the location and/or movement associated with user. The context may be used to determine whether the user is at work, at home, driving, walking, riding a bike, sitting in traffic, etc.

Furthermore, information about one or more user actions with respect to received messages may be determined, such as, for example, a length of time between when the user received a message and when the user responded to the message. A priority function may be determined that relates information about user actions to priority levels. In one implementation, a priority function may be generated based on the assumption that the faster a user responds to a message, the more important the message may be to the user. Thus, for example, a mean response time to messages may be determined. A response time within a standard deviation of the mean response time may be associated with a medium priority level, a response time lower than response times within the standard deviation of the mean response time may be associated with a high priority level, and a response time higher than response times within the standard deviation of the mean response time may be associated with a low priority level.

The extracted features, along with the obtained information about the one or more user actions, the obtained information about user context, and the generated priority function, may be used to generate a model that determines a priority level for a message based on features extracted from the message and based on a current context associated with the user.

Thus, an implementation described herein may further relate to receiving a message by a mobile communication device, extracting one or more features from the received message, determining a priority level for the received message based on a model associated with the user of the mobile communication device, determining a current user context, and adjusting the determined priority level based on the current user context.

Furthermore, an implementation described herein may further relate to enabling a user to assign a particular notification type for a particular priority level. Thus, when a high priority level message is received, the user may receive a first type of notification, and when a low priority message is received, the user may receive a second type of notification. Thus, a user may recognize a low priority message based on the notification and may not need to waste time checking the message. Furthermore, the current context associated with the user may be further used to determine whether to provide a notification. For example, if the user is driving, notifications may not be provided.

A "message," as the term is used herein, is to be broadly interpreted to include any communication received by a mobile communication device from another mobile communication device or from another computer device. For example, a message may include a Short Message Format (SMS) message, a text message, an Instant Messaging (IM) message, an email message, a voicemail message, a telephone call, and/or a social media feed. A social media feed may refer to a message originated by another user and received by the mobile communication device from a server device associated with a social networking web site (e.g., Facebook, Google Plus, Myspace, LinkedIn, Bebo, Meetup, Orkut, etc.), a server device associated with a blogging web site (e.g., Blogger, Livejournal, Wordpress, etc.), a server device associated with a microblogging or liveblogging web site (e.g., Twitter, Tumblr, Plurk, etc.), a server device associated with a social news or bookmarking web site (e.g., Digg, Reddit, Delicious, Slashdot, etc.), a server device associated with a content sharing web site (e.g., Youtube, Picasa, Flickr, etc.), a server device associated with a bookmarking web site (e.g., Digg, Reddit, Delicious, Slashdot, etc.), a server device associated with a check-in web site (e.g., FourSquare, Gowalla, GetGlue, etc.), and/or another type of server device that may send a message, originated by another user, to the user of the mobile communication device.

FIG. 1 is a diagram of an exemplary environment 100 in which the systems and/or methods described herein may be implemented. As shown in FIG. 1, environment 100 may include a mobile communication device 110, a network 120, and a prioritization server device 130. While FIG. 1 shows a single mobile communication device 110, a single network 120, and a single prioritization server device 130 for illustrative purposes, in practice, environment 100 may include multiple mobile communication devices 110, multiple networks 120, and/or multiple prioritization server devices 130.

Mobile communication device 110 (also referred to herein as mobile device 110) may include any portable electronic device with communication functionality, such as, for example, a mobile phone, a smart phone, a tablet computer, a laptop computer, a personal digital assistant (PDA), or another type of portable communication device. Mobile communication device 110 may receive messages and/or feeds from other mobile communication devices 110 or from other computer devices. Mobile communication device 110 may send information associated with a received message or a feed to prioritization server device 130, and may receive information associated with a priority level associated with the received message or feed from prioritization server device 130. Mobile communication device 110 may use the received information to set a priority level for the received message or feed and may act on the message or feed based on the set priority level.

Network 120 may enable mobile communication device 110 to communicate with another mobile communication device 110, with prioritization server device 130, and/or with another computer device, such as a social media server device (not shown in FIG. 1). Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Prioritization server device 130 may include one or more devices, such as a server device, that generate a model, associated with a particular user, for determining priority levels for messages or feeds received by the user via mobile communication device 110. For example, mobile communication device 110 may provide information about features associated with messages or feeds received by mobile communication device 110 along with information about user actions associated with the received messages or feeds. Prioritization server device 130 may use the received information to build the model associated with the user.

Prioritization server device 130 may use the model to determine a priority level for a message or feed received by mobile communication device 110, or may use the model to generate information that may be used by mobile communication device 110 to determine the priority level for the message or feed. For example, mobile communication device 110 may extract one or more features from the received message or feed, may provide information about the extracted one or more features to prioritization server device 130 and prioritization server device 130 may use the received information and the model to determine a priority level for the message or feed. Prioritization server device 130 may provide information about the determined priority level to mobile communication device 110.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
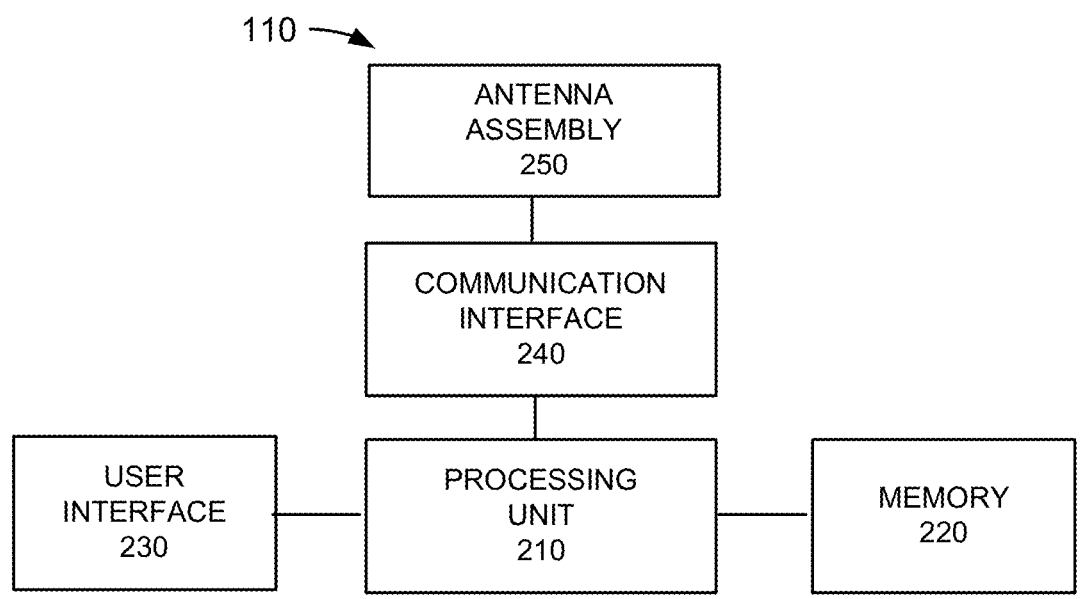
FIG. 2 is a diagram illustrating exemplary components of the mobile communication device of FIG. 1.

FIG. 2 is a diagram illustrating exemplary components of mobile communication device 110 according to an implementation described herein. As shown in FIG. 2, mobile communication device 110 may include a processing unit 210, a memory 220, a user interface 230, a communication interface 240, and an antenna assembly 250.

Processing unit 210 may include one or more processors, microprocessors, application specific integrated circuits (ASICs), field programmable gate arrays (FPGAs), or other processing logic. Processing unit 210 may control operation of mobile communication device 110 and the components of mobile communication device 110.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may include mechanisms for inputting information to mobile communication device 110 and/or for outputting information from mobile communication device 110. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, a keyboard, or keys of a keypad) and/or a touchscreen to permit data and control commands to be input into mobile communication device 110; a display, such as a liquid crystal display (LCD), to output visual information; a vibrator to cause mobile communication device 110 to vibrate; and/or any other type of input or output device.

Communication interface 240 may include a transceiver that enables mobile communication device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 240 may include a transmitter that converts baseband signals to radio frequency (RF) signals and/or a receiver that converts RF signals to baseband signals. Communication interface 240 may be coupled to antenna assembly 250 for transmitting and receiving RF signals.

Communication interface 240 may also include a logical component that includes input and/or output ports, input and/or output systems, and/or other input and output components that facilitate the transmission of data to other devices. For example, communication interface 240 may include a network interface card (e.g., Ethernet card) for wired communications and/or a wireless network interface (e.g., a WiFi) card for wireless communications. Communication interface 240 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

As described herein, mobile communication device 110 may perform certain operations in response to processing unit 210 executing software instructions contained in a computer-readable medium, such as memory 220. A computer-readable medium may be defined as a non-transitory memory device. A memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 2 shows example components of mobile communication device 110, in other implementations, mobile communication device 110 may include fewer components, different components, differently arranged components, or additional components than depicted in FIG. 2. Additionally or alternatively, one or more components of mobile communication device 110 may perform the tasks described as being performed by one or more other components of mobile communication device 110.

Figure 3:
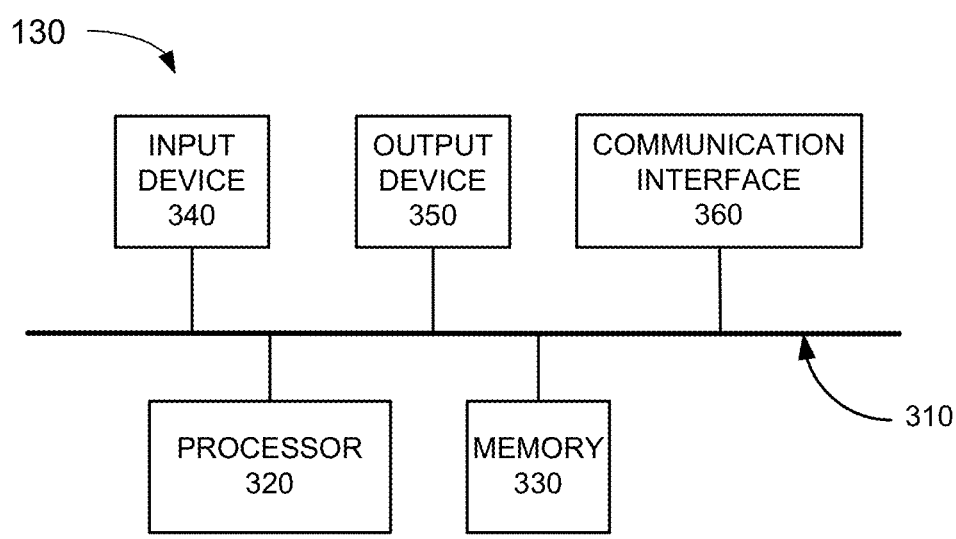
FIG. 3 is a diagram illustrating exemplary components of the prioritization server device of FIG. 1.

FIG. 3 is a diagram illustrating exemplary components of prioritization server device 130 according to an implementation described herein. As shown in FIG. 3, prioritization server device 130 may include a bus 310, a processor 320, a memory 330, an input device 340, an output device 350, and a communication interface 360.

Bus 310 may include a path that permits communication among the components of prioritization server device 130. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into prioritization server device 130. Input device 340 may include, for example, a keyboard, a mouse, a pen, a microphone, a remote control, an audio capture device, an image and/or video capture device, a touch-screen display, and/or another type of input device. In some embodiments, prioritization server device 130 may be managed remotely and may not include input device 340. In other words, prioritization server device 130 may be "headless" and may not include a keyboard, for example.

Output device 350 may output information to an operator of prioritization server device 130. Output device 350 may include a display, a printer, a speaker, and/or another type of output device. For example, prioritization server device 130 may include a display, which may include a liquid-crystal display (LCD) for displaying information. In some embodiments, prioritization server device 130 may be managed remotely and may not include output device 350. In other words, prioritization server device 130 may be "headless" and may not include a display, for example.

Communication interface 360 may include a transceiver that enables prioritization server device 130 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals.

Communication interface 360 may also include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, an RFID interface, an NFC wireless interface, and/or any other type of interface that converts data from one form to another form.

As will be described in detail below, prioritization server device 130 may perform certain operations relating to generating a model, associated with a user, which relates features, associated with a message or feed, to a priority level associated with the message or feed and relating to determining a priority level for a message or feed received by the user. Prioritization server device 130 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of prioritization server device 130, in other implementations, prioritization server device 130 may include fewer components, different components, additional components, or differently arranged components than depicted in FIG. 3. Additionally or alternatively, one or more components of prioritization server device 130 may perform one or more tasks described as being performed by one or more other components of prioritization server device 130.

Figure 4:
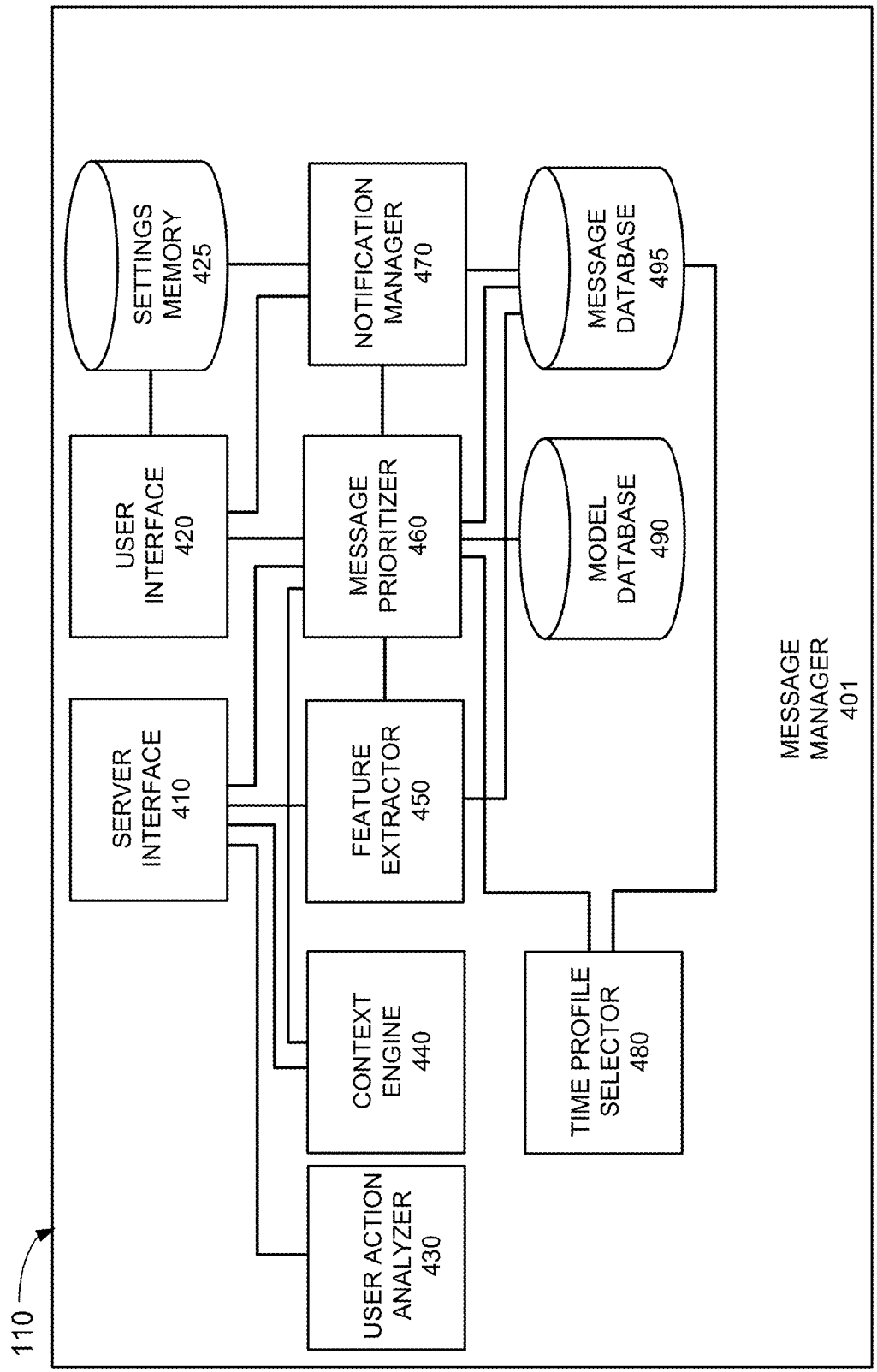
FIG. 4 is a diagram illustrating exemplary functional components of the mobile communication device of FIG. 1.

FIG. 4 is a diagram illustrating exemplary functional components of mobile communication device 110. The functional components of mobile communication device 110 may be implemented, for example, via processing unit 210 executing instructions from memory 220. Alternatively, some or all of the functional components of mobile communication device 110 may be hardwired. As shown in FIG. 4, mobile communication device 110 may include a message manager 401. Message manager 401 may manage messages received by mobile communication device 110. For example, message manager 401 may receive messages, determine priority levels for messages, may organize messages based on priority levels, and/or may provide notifications about messages to the user based on the priority levels. Message manager 401 may include a server interface 410, a user interface 420, a settings memory 425, a user action analyzer 430, a context engine 440, a feature extractor 450, a message prioritizer 460, a notification manager 470, a time profile selector 480, a model database 490, and a message database 495.

Server interface 410 may communicate with prioritization server device 130. For example, server interface 410 may receive information about messages from feature extractor 450, may receive information about user actions from user action analyzer 430, and/or may receive information about user context from context engine 440 and may provide the received information to prioritization server device 130. Server interface 130 may receive a model for prioritizing messages from prioritization server device 130 and may provide the model to message prioritizer 460. Message prioritizer 460 may store the received model in model database 490. Server interface 410 may also receive content associated with a particular message from feature extractor 450 and may send the received content to prioritization server device 130. Prioritization server device 130 may process the content with respect to one or more features (e.g., tag the content with a parts-of-speech tagger and/or a named entity recognizer) and return the processed content to server interface 130. Server interface 130 may provide the processed content to message prioritizer 460.

User interface 420 may provide an interface to enable the user to interact with message manager 401. For example, user interface 420 may provide messages to the user, may provide notifications about messages to the user, and/or may enable the user to select one or more settings associated with message manager 401. For example, user interface 420 may enable the user to select a particular notification for a particular priority level, may enable the user to select a privacy and speed setting for determining priority levels for messages, and/or may enable the user to select how to organize different types of messages. Settings memory 425 may store one or more settings, associated with message manager 410, that have been selected by the user via user interface 420.

User action analyzer 430 may obtain information about one or more user actions associated with a message and may analyze the information to determine a user action associated with a message, such as, for example, how long it took a user to respond to a message, how long a user spent interacting with message, whether the user took a particular action with respect to the message (e.g., labeling the message with a particular label, deleting the message, moving the message to a particular folder, etc.), whether the user manually labeled a particular message with a particular priority level, and/or another type of user action. User action analyzer 430 may provide the information to server interface 410.

In one implementation, context engine 440 may provide information about a location and/or movement associated with mobile communication device 110 to prioritization server device 130 and prioritization server device 130 may use the obtained information to determine the current context associated with mobile communication device 110. In another implementation, context engine 440 may determine a context associated with a user. For example, context engine 440 may determine a location and/or movement associated with mobile communication device 110. The location of mobile communication device 110 may be determined using a Global Positioning System (GPS) receiver included in mobile communication device 110, using a multilateration technique based on signals exchanged between mobile communication device 110 and base stations, using location of a local receiver that receives signals from mobile communication device 110 (e.g., a WiFi access point), and/or using another technique. Movement of mobile communication device 110 may be determined based on determining multiple locations of mobile communication device 110 within a particular time period, using an accelerometer or another movement sensor included in mobile communication device 110, and/or using another technique.

Context engine 440 may associate a particular location with a particular context. For example, context engine 440 may associate a first location with the user's work location and a second location with the user's home location. In one implementation, the context may be determined by prompting the user to specify the context. In another implementation, the context may be determined automatically. For example, the user's location during business hours may be associated with a work context and the user's location during evening hours may be associated with a home context. As another example, the context may be associated with a particular location based on content of messages (e.g., named entities, particular phrases matched against a list of phrases indicative of a work location, etc.) received while mobile communication device 110 is in the particular location.

Context engine 440 may also associate a particular movement speed and/or type with a particular context. As an example, context engine 440 may associate a first range of speeds with a walking context, a second range of speeds with a biking context, and a third range of speeds with a driving context. As another example, context engine 440 may associate a particular type of movement with a particular context. For example, if mobile communication device 110 is not moving for a particular length of time, followed by movement at a speed greater than a particular threshold, context engine 440 may determine that the context corresponds to a public transportation context. As another example, context engine 440 may detect motion combined with short stops of a particular duration and may determine that the context corresponds to a public transportation context. As yet another example, context engine 440 may detect stop-and-go motion of a particular pattern and may determine that the context corresponds to a "driving in traffic" context. Context engine 440 may further distinguish between a driving context and a public transportation context by correlating the user's location to locations of public transportation routes and/or locations of roads.

Feature extractor 450 may extract one or more features from a message received by mobile communication device 110. For example, feature extractor 450 may extract features relating to a contact associated with the message, may extract features relating to the content of the message (e.g., features relating to named entities included in the message, features relating to parts of speech included in the message, features relating to particular terms or phrases included in the message), and/or may extract features relating to when the message was received.

Feature extractor 450 may provide the extracted one or more features to server interface 410 in order for prioritization server device 130 to determine a priority level for the message based on the one or more features. Feature extractor 450 may determine which features to send to prioritization server device 130 based on a privacy and speed setting. For example, a high privacy and low speed setting may cause feature extractor 450 to send less information to prioritization server device 130 and a low privacy and high speed setting may cause feature extractor 450 to send more information to prioritization server device 130.

Message prioritizer 460 may prioritize messages based on a priority level associated with messages. For example, message prioritizer 460 may generate a list of messages organized based on priority levels (e.g., high priority messages listed above medium priority messages, medium priority messages listed above low priority messages, etc.). In one implementation, message prioritizer 460 may determine a priority level for a message locally based on information about the message obtained from feature extractor 450, based on a current user context determined by context engine 440, and based on a model stored in model database 490. Moreover, message prioritizer 460 may change the priority level assigned to a message over time based on a time profile assigned to the message by time profile selector 480. In another implementation, message prioritizer 460 may receive a priority level for a message from prioritization server device 130.

Notification manager 470 may determine a particular notification for a particular message based on the priority level associated with the particular message. For example, notification manager 470 may activate a first sound file for a message associated with a first priority level and a second sound file for a message associated with a second priority level. Furthermore, notification manager 470 may determine whether to provide a particular notification based on a current context associated with the user. For example, if the user is associated with a driving context, notification manager 470 may delay notifications until the context changes.

Time profile manager 480 may select a time profile for a priority level associated with a message. In one implementation, a priority level assigned to a message may not change over time. In another implementation, the time profile may be based on a decaying exponential function and thus the priority level assigned to a message may decay exponentially over time. In yet another implementation, the time profile may be based on a function that increases up to a particular time and then decreases. The particular time may correspond to a time included in the content of the message. In yet another implementation, the time profile may be based on another type of function.

Model database 490 may store one or more models for prioritizing messages received by mobile communication device 110. The one or more models may be received from prioritization server device 130. Exemplary information that may be stored in model database 490 may correspond to information stored in user models database 570 with respect to the user of mobile communication device 110. Message database 495 may store messages received by mobile communication device 110. Exemplary information that may be stored in message database 495 is described below with reference to FIG. 6A.

Although FIG. 4 shows exemplary functional components of mobile communication device 110, in other implementations, mobile communication device 110 may include fewer functional components, different functional components, differently arranged functional components, or additional functional components than depicted in FIG. 4. Additionally or alternatively, one or more functional components of mobile communication device 110 may perform functions described as being performed by one or more other functional components of mobile communication device 110.

Figure 5:
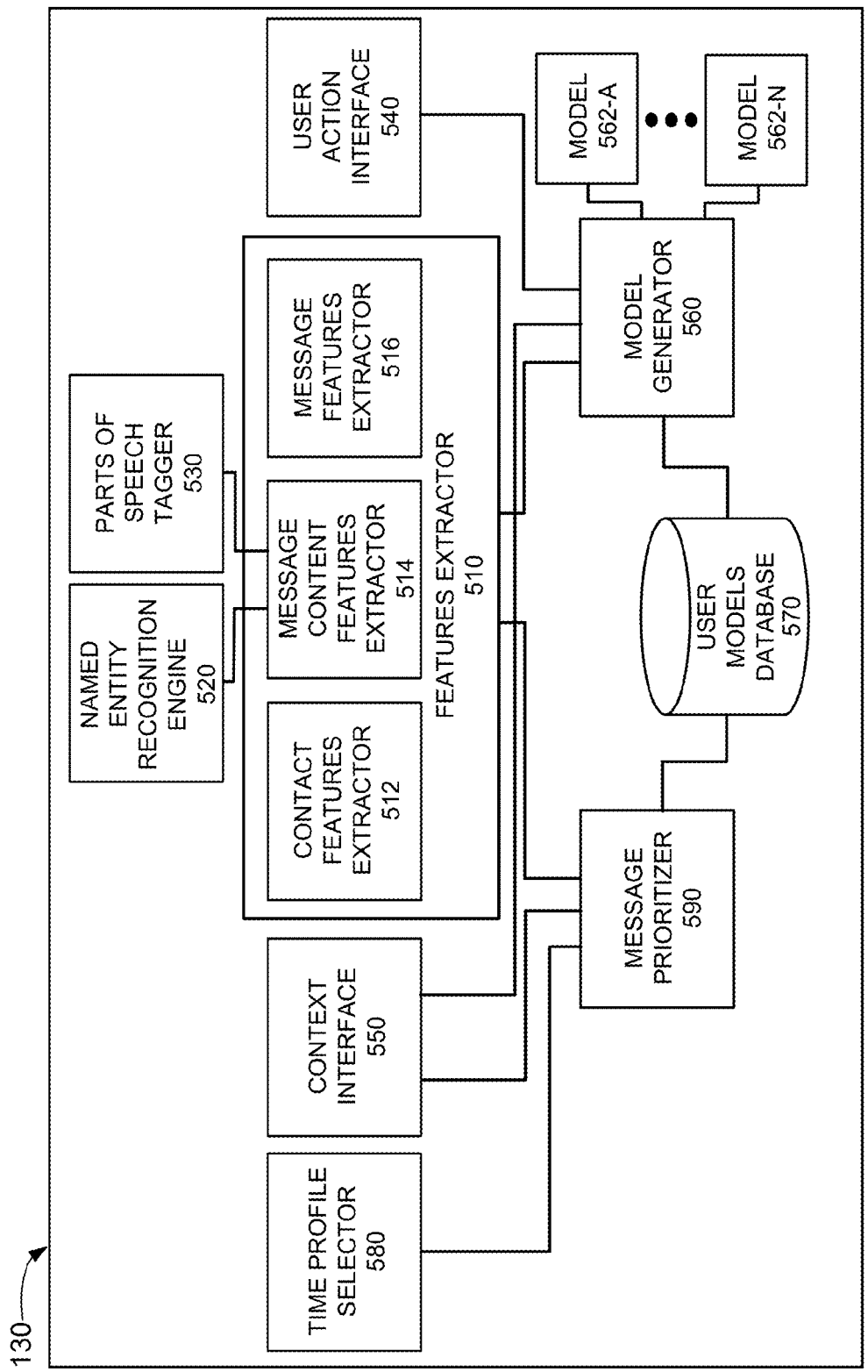
FIG. 5 is a diagram illustrating exemplary functional components of the prioritization server device of FIG. 1.

FIG. 5 is a diagram illustrating exemplary functional components of prioritization server device 130. The functional components of prioritization server device 130 may be implemented, for example, via processor 320 executing instructions from memory 330. Alternatively, some or all of the functional components of prioritization server device 130 may be hardwired. As shown in FIG. 5, prioritization server device 130 may include a features extractor 510, a named entity recognition (NER) engine 520, a parts of speech tagger 530, a user action interface 540, a context interface 550, a model generator 560, one or more models 562-A to 562-N (referred to herein collectively as "models 562" and individually as "model 562"), a user models database 570, a time profile selector 580, and a message prioritizer 590.

Features extractor 510 may extract one or more features from a message received by mobile communication device 110. Features extractor 510 may include a contact features extractor 512, a message content features extractor 514, and a message features extractor 516. Contact features extractor 512 may extract features related to a contact associated with a message, such as, for example, how often the user receives messages from the contact, a ratio of the number of messages received from the contact to the number of messages sent to the contact, etc. Content features extractor 514 may extract features related to the content of the message, such as, for example, whether the message includes particular tokens, characters, words, and/or phrases, features related to parts of speech, features related to named entities, etc. Content features extractor 514 may use NER engine 520 and/or parts of speech tagger 530 in extracting features from the content of the message. Message features extractor 516 may extract features associated with the message that do not relate to the content of the message, such as when the message was received (e.g., what day of the week the message was received, what time of day the message was received, whether the message was received during a particular date range, etc.).

NER engine 520 may determine named entities that are included in a message and/or may determine a number of named entities of a particular type that are included in the message. In one implementation, NER engine 520 may identify named entities in a message by comparing terms or phrases in the message to a list of named entities. In another implementation, NER engine 520 may identify named entities using another technique, such as, for example, analyzing a particular term in a message with respect to terms within a particular number of terms of the particular term, determining whether a term or phrase is capitalized, etc. NER engine 520 may identify a particular named entity as a named entity of a particular type, such as, for example, an organization type, a product type, a location type, an event type, a date type, a time type, and/or another type of named entity.

Parts of speech tagger 530 may identify a part of speech for each term in the message and may tag each term with the identified part of speech. For example, parts of speech tagger 530 may tag a term as a noun, verb, adjective, adverb, pronoun, conjunction, interjection, and/or another type of tag. Furthermore, parts of speech tagger 530 may determine a count for each part of speech for a message.

User action interface 540 may obtain information about one or more user actions associated with a message and may analyze the information to determine a user action associated with a message. User action interface 540 may provide the information to model generator 560.

Context interface 550 may obtain information about a current context associated with the user based on information obtained from context engine 440. For example, context interface 550 may obtain information about a location and/or movement associated with mobile communication device 110 and may determine a current context associated with the user based on the obtained information in a process analogous to the process described above with reference to context engine 440.

Model generator 560 may generate one or more models for a user based on information obtained from features extractor 510, user action interface 540, and/or context interface 550. Model generator 560 may use one or more models 562-A to 562-N (referred to herein collectively as "models 562" and individually as "model 562"). Each model 562 may use a different type of model to generate a model for the user. For example, model 562-A may be associated with a linear regression model, model 562-B may be associated with a Support Vector Machines model, model 562-C may be associated with a least median squares regression model, model 562-D may be associated with a k-nearest neighbor regression model, and/or model 562-E may be associated with another type of model.

Model generator 560 may use one or more models 562 to generate weights for the features that are to be used in determining a priority level for a message by relating features extracted from messages to user actions associated with the messages. For example, the features may be related to response times associated with the messages in order to determine the weights for the features. The generated weights may be used to determine an expected response time for a received message based on features associated with the message.

User models database 570 may store models associated with the user. Exemplary information that may be stored in user models database 570 is described below with reference to FIG. 6B.

In one implementation, prioritization server device 130 may develop and/or maintain a model for prioritizing messages for a particular user and may provide the model to mobile communication device 110 associated with the particular user. Prioritization server device 130 may also perform feature processing for messages (e.g., using NER engine 520 and/or parts-of-speech tagger 530 to tag messages). Mobile communication device 110 may use the model to determine priority levels for messages. In another implementation, prioritization server 130 may determine a priority level for a message and provide the determined priority level to mobile communication device 110.

Time profile manager 580 may select a time profile for a priority level associated with a message analogous to the process described above with respect to time profile selector 480. Message prioritizer 590 may assign a priority level to a message based on features extracted from the message and based on a current context associated with the user as determined by context interface 550 using a model that has been generated for the user and stored in user models database 570. Message prioritizer 590 may further obtain a selected time profile, for the priority level assigned to the message, from time profile manager 580. Message prioritizer 590 may provide the determined priority level, and a selected time profile, to mobile communication device 110.

Although FIG. 5 shows exemplary functional components of prioritization server device 130, in other implementations, prioritization server device 130 may include fewer functional components, different functional components, differently arranged functional components, or additional functional components than depicted in FIG. 5. Additionally or alternatively, one or more functional components of prioritization server device 130 may perform functions described as being performed by one or more other functional components of prioritization server device 130.

Figure 6A:
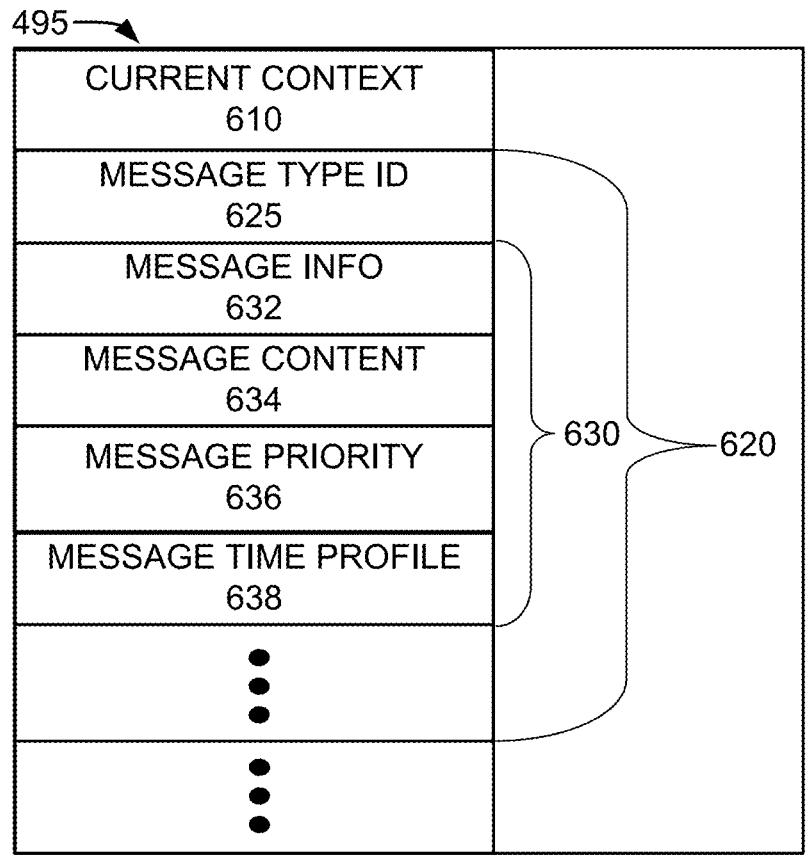
FIG. 6A is a diagram of exemplary components that may be stored in the messages and feeds database of FIG. 4.

FIG. 6A is a diagram of exemplary components that may be stored in the message database 460. Message database 460 may include a current context field 610 and one or more message type records 620. Current context field 610 may store information about a current context associated with the user as determined by context engine 440 or as obtained from prioritization server device 130. Message type field 620 may store information about messages of a particular type. For example, a first message type field 620 may store information about SMS messages, a second message type field 620 may store information about email messages, a third message type field 620 may store information about Facebook messages, a fourth message type field 620 may store information about Twitter messages, etc. Message type field 620 may include a message type identifier (ID) field 625 and one or more message fields 630. Message type ID field 625 may identify the particular message type associated with message type field 620.

Message field 630 may include information about a particular message. Message field 630 may include a message information field 632, a message content field 634, a message priority field 636, and a message time profile field 638. Message information field 632 may include information about the message, such as, for example, a header associated with the message, a time stamp associated with the message, and/or another type of information associated with the message. Message content field 634 may store the content associated with the message. Message priority field 636 may store the priority level associated with the message. Message time profile field 638 may store a time profile associated with the message.

Although FIG. 6A shows exemplary components of messages and feeds database 460, in other implementations, messages and feeds database 460 may include fewer components, different components, differently arranged components, or additional components than depicted in FIG. 6A.

Figure 6B:
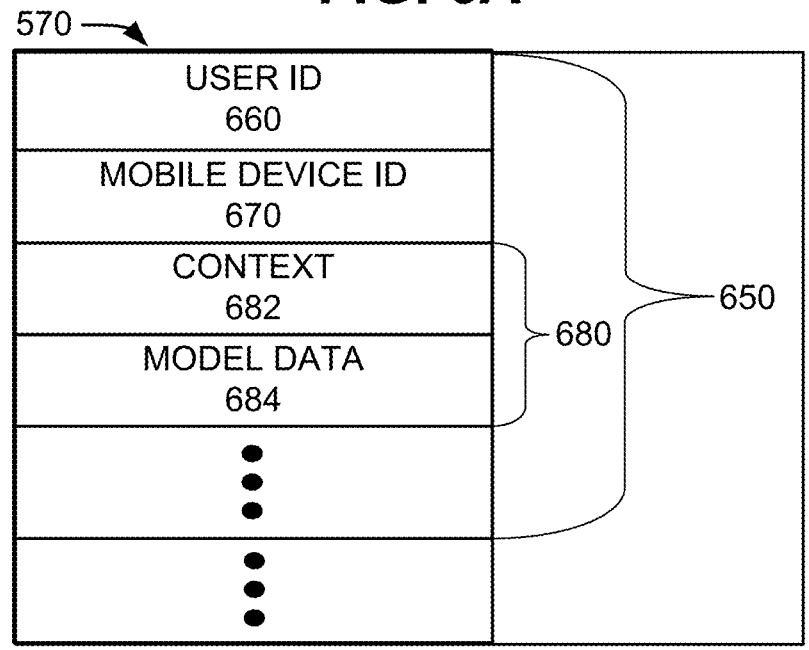
FIG. 6B is a diagram of exemplary components that may be stored in the user models database of FIG. 4.

FIG. 6B is a diagram of exemplary components that may be stored in the user models database 570. As shown in FIG. 6B, user models database 570 may include one or more user records 650 (referred to herein collectively as "user records 650" and individually as "user record 650"). User record 650 may include a user ID field 660, a mobile device ID field 670, and one or more model fields 680.

User ID field 660 may store information identifying a particular user, such as, for example, a username and password associated with the user, an account number associated with the user, and/or another type of identifier associated with the user. Mobile device ID field 670 may include information identifying mobile communication device 110 associated with the particular user, such as, for example, a Mobile Subscriber Integrated Services Digital Network number (MSISDN), an International Mobile Subscriber Identity (IMSI) number, a mobile identification number (MIN), an International Mobile Equipment Identifier (IMEI), an Integrated Circuit Card Identifier (ICCI), and/or any other mobile communication device identifier.

Model device ID field 680 may store information about a particular model associated with the user. For example, each context associated with the user may be associated with a different model. Model device ID field 680 may include a context field 682 and a model data field 684. Context field 682 may identify the particular context associated with the particular model. Model data field 684 may store model data associated with the particular model. For example, model data field 684 may store weights associated with particular features obtained from feature extractor 510.

Although FIG. 6B shows exemplary components of user models database 570, in other implementations, user models database 570 may include fewer components, different components, differently arranged components, or additional components than depicted in FIG. 6B.

Figure 7A:
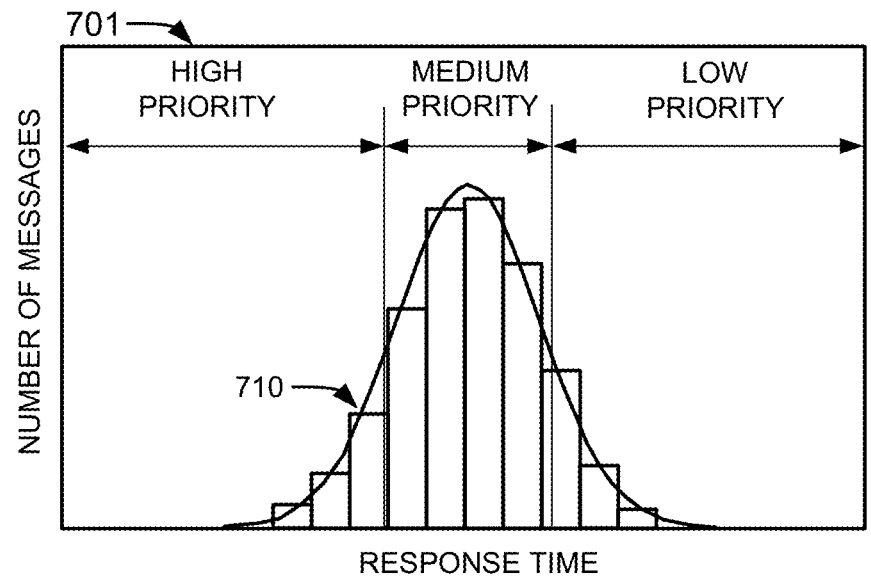
FIG. 7A is a diagram of a first exemplary priority function relating response times to priority levels associated with messages.

FIG. 7A is a diagram of a first exemplary priority function 701 relating response times to priority levels associated with messages. Priority function 701 may be based on a response time curve 710 associated with the user. Response time curve 710 may be based on information that relates a particular number of messages to a particular response time and may approach to a normal distribution. A response time for a message may correspond to the time period between when the message was received and when the user responded to the message. Priority function 701 may associate a particular priority level with a range of response times. For example, priority function 701 may associate a medium priority level with response times within a standard deviation of the mean response time of response time curve 710, may associate a high priority level with response times lower than response times within a standard deviation of the mean response time of response time curve 710, and may associate a low priority level with response times higher than response times within a standard deviation of the mean response time of response time curve 710. When an expected response time is estimated for a message, priority function 701 may be used to determine a priority level associated with the expected response time.

Figure 7B:
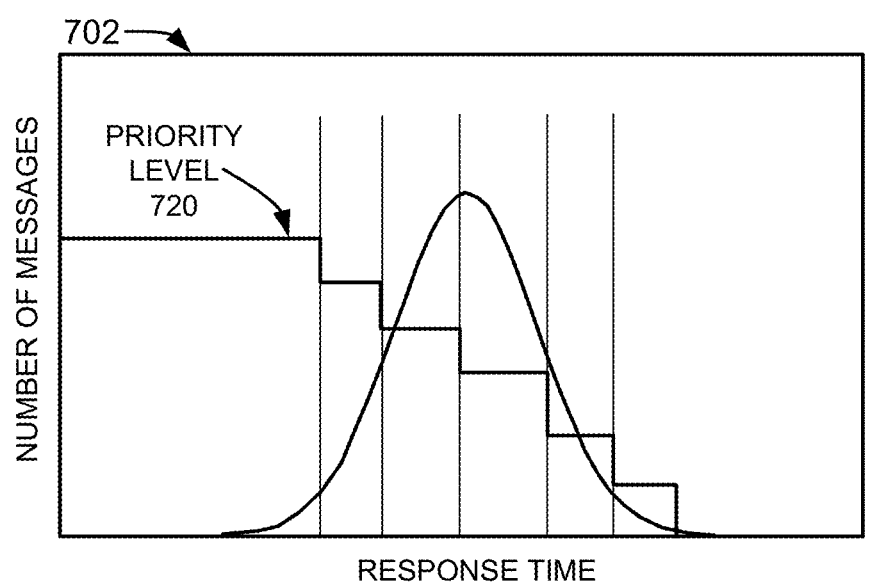
FIG. 7B is a diagram of a second exemplary priority function relating response times to priority levels associated with messages.

FIG. 7B is a diagram of a second exemplary priority function 702 relating response times to priority levels associated with messages. Priority function 702 may be based on a response time curve 710 and may associate a particular priority level (labeled as item 720 in FIG. 7B) with a range of response times. Priority function 702 may include a series of priority levels that decrease with increasing response times. When an expected response time is estimated for a message, priority function 702 may be used to determine a priority level associated with the expected response time.

Figure 8A:
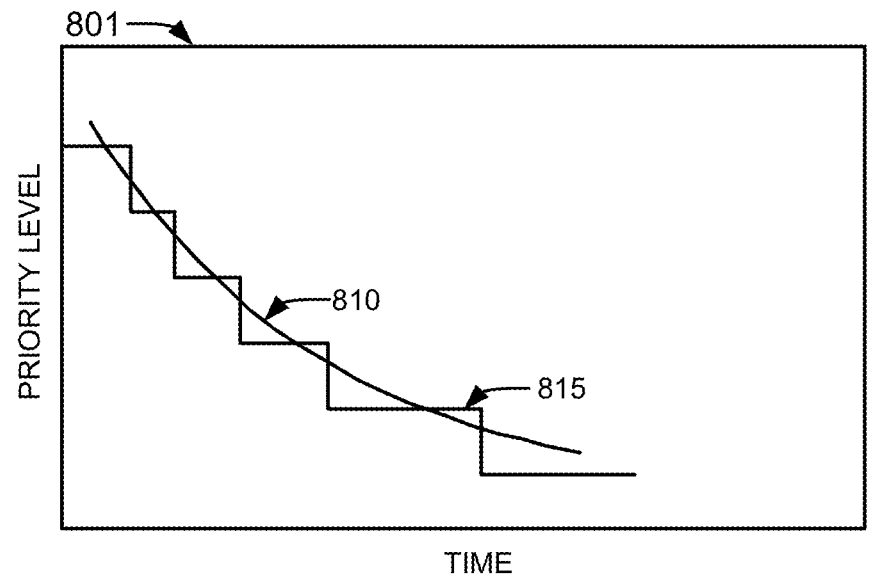
FIG. 8A is a diagram of a first exemplary time profile associated with a message or feed.

FIG. 8A is a diagram of a first exemplary time profile 801 associated with a message or feed. Time profile 801 may include a series of priority levels weights 810 as a function of time that may be based on an exponentially decaying function 815. A priority level weight 810 may be applied to a priority level assigned to a message. Thus, if time profile 801 is associated with a message, the priority level assigned to the message may exponentially decay over time.

Figure 8B:
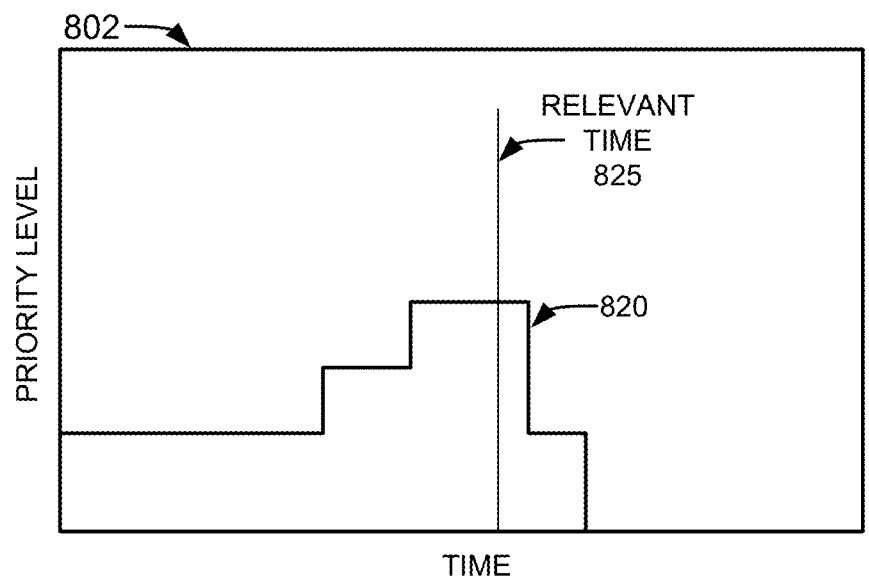
FIG. 8B is a diagram of a second exemplary time profile associated with a message or feed.

FIG. 8B is a diagram of a second exemplary time profile 802 associated with a message or feed. Time profile 802 may be assigned to a message if the message is associated with a relevant time 825 and may include a series of priority level weights 820. A message may be associated with relevant time 825 when, for example, NER engine 520 detects a named entity of a time type. If time profile 802 is assigned to a message, the priority level assigned to the message may increase over time until relevant time 825 is reached. After the relevant time 825 is reached, the priority level may decrease over time. Thus, for example, if a text message includes the text "we will meet for lunch at 12:30 PM," the priority level of the text message may increase at a first rate as the time approached 12:30 PM, and may decrease at a second rate after 12:30 PM, as the text message may not be relevant after 12:30 PM.

Figure 9:
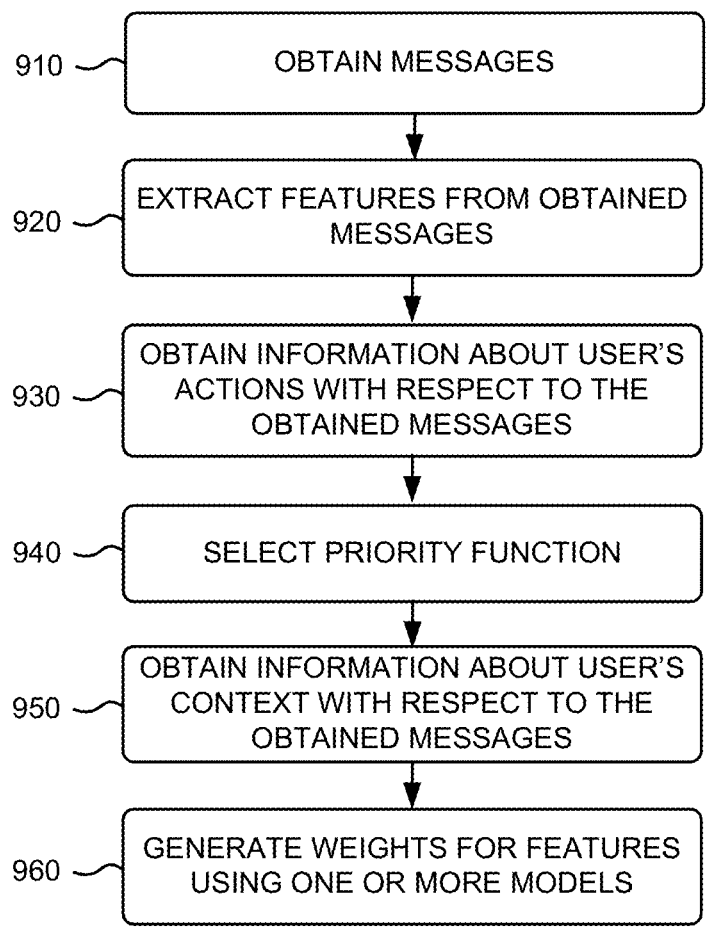
FIG. 9 is a flow chart of an exemplary process for generating a model that relates message or feed features to priority levels according to an implementation described herein.

FIG. 9 is a flow chart of an exemplary process for generating a model that relates message or feed features to priority levels according to an implementation described herein. In one implementation, the process of FIG. 9 may be performed by prioritization service device 130. In other implementations, some or all of the process of FIG. 9 may be performed by another device or a group of devices separate from prioritization service device 130 and/or including prioritization service device 130, such as, for example, mobile communication device 110.

The process of FIG. 9 may include obtaining messages (block 910). For example, mobile communication device 110 may receive a message (e.g., a text message, an email message, an IM message, a voicemail message), originated by another user, from another mobile communication device or from a server device.

Features may be extracted from the obtained messages (block 920). In one implementation, one or more features may be extracted from an obtained message by feature extractor 450 of mobile communication device 110. In another implementation, some or all of the features may be extracted by features extractor 510 of prioritization server device 130. For example, mobile communication device 110 may forward content of a received message, and/or information about the received message, to prioritization server device 130 for processing.

A feature that may be extracted may relate to a contact associated with a received message. For example, a feature that may be extracted may include a ratio of a total number of messages sent to a contact to the sum of total number of messages both sent to the contact and received from the contact. Another feature that may be extracted may include a ratio of the sum of the number of messages sent to a contact and the number of messages received by the contact to the sum of the number of messages sent to all contacts and the number of messages received from all contacts.

Another feature that may be extracted may include a ratio of the number of messages sent a contact to the number of messages sent to all contacts. Another feature that may be extracted may include a ratio of the number of messages received by a contact to the number of messages received from all contacts.

Another feature that may be extracted may include a ratio of the number of messages received from a contact within a particular period of time in the past (e.g., number of messages received from the contact in the past week, the number of messages received from the contact between 1 week and 2 weeks ago, the number of messages received from the contact between 2 weeks and 4 weeks ago, etc.).

Another feature that may be extracted may include a ratio of the number of messages sent to the contact within a particular period of time in the past (e.g., number of messages sent to the contact in the past week, the number of messages sent to the contact between 1 week and 2 weeks ago, the number of messages sent to the contact between 2 weeks and 4 weeks ago, etc.).

Another feature that may be extracted may include the number of messages received from a contact within a particular time period during the day (e.g., messages received from the contact between 11 pm to 6 am, messages received from the contact between 6 am and 9 pm, etc.). Another feature that may be extracted may include the number of messages sent to a contact within a particular time period during the day (e.g., messages sent to the contact between 11 pm to 6 am, messages sent to the contact between 6 am and 9 pm, etc.).

Another feature that may be extracted may include the number of messages received by a contact during each particular day of the week. Another feature that may be extracted may include the number of messages sent to a contact during each particular day of the week.

Another feature that may be extracted may include a number of missed calls received from a contact within a particular time period in the past. Another feature that may be extracted may include an average length of a call associated with a contact within a particular time period in the past.

A feature that may be extracted may relate to content included in a received message. For example, a feature that may be extracted may include a total number of words and/or tokens in a message. Another feature that may be extracted may include a total number of characters in a message. Another feature that may be extracted may include a total number of ellipses (e.g., " . . . " tokens) in a message. Another feature that may be extracted may include a total number of exclamation marks (e.g., "!" tokens) in a message. Another feature that may be extracted may include a total number of questions marks (e.g., "?" tokens) in a message. Another feature that may be extracted may include a total number of hashmark characters (e.g., "#" tokens) in a message. Another feature that may be extracted may include a total number of emoticons in a message.

Another feature that may be extracted may include an indication of whether a message includes a phone number. Another feature that may be extracted may include an indication of whether a message includes an email address. Another feature that may be extracted may include a number of words in a message of a particular part of speech (e.g., a number of nouns in the message, a number of verbs in the message, a number of adjectives in the message, a number of pronouns in the message, a number of adverbs in the message, a number of interjections in the message, etc.). Another feature that may be extracted may include a number of foreign words in a message. Another feature that may be extracted may include a number of symbols in a message.

Another feature that may be extracted may include a number of named entities on a message. Another feature that may be extracted may include a number of named entities of a particular type in the message (e.g., a number of named entities of a person type, a number of named entities of an organization type, a number of named entities of a product type, a number of named entities of a location type, a number of named entities of an event type, a number of named entities of a date type, a number of named entities of a time type, etc.). Another feature that may be extracted may include an indication that a particular named entity is included in a message.

Another feature that may be extracted may be an indication as to whether an email address associated with a contact includes the same domain as an email address associated with the user. Another feature that may be extracted may be an indication as to whether an email address associated with a contact is included in the user's email address book. Another feature that may be extracted may include an indication as to whether a message is associated with an auto-responder address.

Another feature that may be extracted may include a total number of recipients in a "to" field associated with a message. Another feature that may be extracted may include a total number of recipients in a "cc" field associated with a message. Another feature that may be extracted may include an indication as to whether the message includes a "bcc" recipient. Another feature that may be extracted may include an indication as to whether a message is part of an existing conversation (e.g., an email thread). Another feature that may be extracted may include an indication as to whether a message is a forwarded message.

Another feature that may be extracted may include a number of tokens included in a message that correspond to tokens included in a file of frequent tokens. Another feature that may be extracted may include a number of words in a subject field associated with a message. Another feature that may be extracted may include an indication as to whether the message includes an attachment. Another feature that may be extracted may include a total number of Uniform Resource Locators (URLs) in a message.

Information about a user's actions with respect to the obtained messages may be obtained (block 930). User action analyzer 430 may obtain information relating to a user action taken with respect to the received message. For example, information may be obtained identifying an amount of time between when a message was received and when the user responded to a message. As another example, information may be obtained about an amount of time between when a message was received and when the user performed a particular action associated with a message (e.g., when the user opened the message, when the user opened an attachment included in the message, etc.). As yet another example, information may be obtained identifying whether the user performed a particular action with respect to the message (e.g., whether the user has deleted the message, whether the user has marked the message as spam, whether the user has moved the message to a particular folder, whether the user has labeled the message with a particular label, etc.). As yet another example, information may be obtained identifying an amount of time the user spent consuming/reviewing the message (e.g., a time between when a user opened the message and when the user closed the message). As yet another example, a user may manually label a message with a particular priority level. A message manually labeled by the user with a particular priority level may be given more weight, compared to other messages, when using the message in generating a model to predict priority levels for messages.

A priority function may be selected (block 940). For example, model generator 560 may select priority function 701, priority function 702, or another priority function that relates a particular priority level to a particular expected response time (or to another type of user action). In one implementation, the user may be provided with an option to select a particular priority function to be used for determining priority levels for messages. In another implementation, a particular priority function may be selected automatically based on one or more criteria, such as a distribution of response times determined for the user.

Information about the user's context with respect to the obtained messages may be obtained (block 950). For example, context interface 550 may obtain information relating to a context associated with the user when a particular user action was performed with respect to a particular message. For example, context engine 440 may determine whether the user was at work when responding to a message, whether the user was at home when responding to a message, or whether the user was driving when responding to a message and provide information about the determination to context interface 550.

Weights for the features may be generated using one or more models (block 960). For example, model generator may generate one or more models for the user based on the features associated with the messages, based on the information obtained about the user context, and based on the information obtained about the user's actions with respect to the messages.

Model generator 560 may generate a model that relates features to an expected user action. For example, the model may relate a set of features, associated with a message, to an expected response time for the message. The model may include a series of weights assigned to particular features. Additionally or alternatively, the model may classify a set of features into a particular class from a plurality of classes. For example, a particular range of response times may be associated with a particular priority level (e.g., using priority function 701) and each priority level may correspond to a one of the classes in the plurality of classes. Thus, the model may classify a set of features, associated with a message, into a class representing a range of expected response times, and correspondingly into a particular priority level.

In one implementation, each user context may be associated with a different model and thus a different set of weights. For example, a first user context may be associated with a first model and a second user context may be associated with a second model. Message prioritizer 590 may select a particular model corresponding to the current user context. In another implementation, the user context may correspond to one or more features that are incorporated into a model and the current user context may be used together with features associated with a message to use the model to determine a priority level for the message. In yet another implementation, user context may be used to determine an adjustment to a priority level determined using the model.

Model generator 560 may generate multiple models using different models 562, such as a model based on a linear regression model, a model based on a Support Vector Machines model, a model based on a least median squares regression model, and/or a model based on a k-nearest neighbor regression model. Model generator 560 may combine the generated models into an ensemble model by, for example, combining weights for a particular feature from different models into a weighted average weight for the particular feature (e.g., a first model may be given a higher weight than a second model). The ensemble model may result in a more accurate model compared to the individual models.

In one implementation, the process of FIG. 9 may be performed using a particular type of message. For example, the process of FIG. 9 may be performed for text messages received by the user. The model generated for text messages may be used to bootstrap a model for another type of message, such as, for example, a particular type of social media feed (e.g., Facebook updates). For example, weight for features from the model generated for text messages may be assigned as initial weights for features for a model for Facebook updates. The initial weights may be subsequently modified based on features extracted from Facebook updates to make the model more accurate with respect to Facebook updates. As another example, the process of FIG. 9 may be performed independently for each message type and each message type may be associated with its own model. In another implementation, the process of FIG. 9 may be performed with respect to messages of different message types and the model may be applied to messages of different message types.

Figure 10:
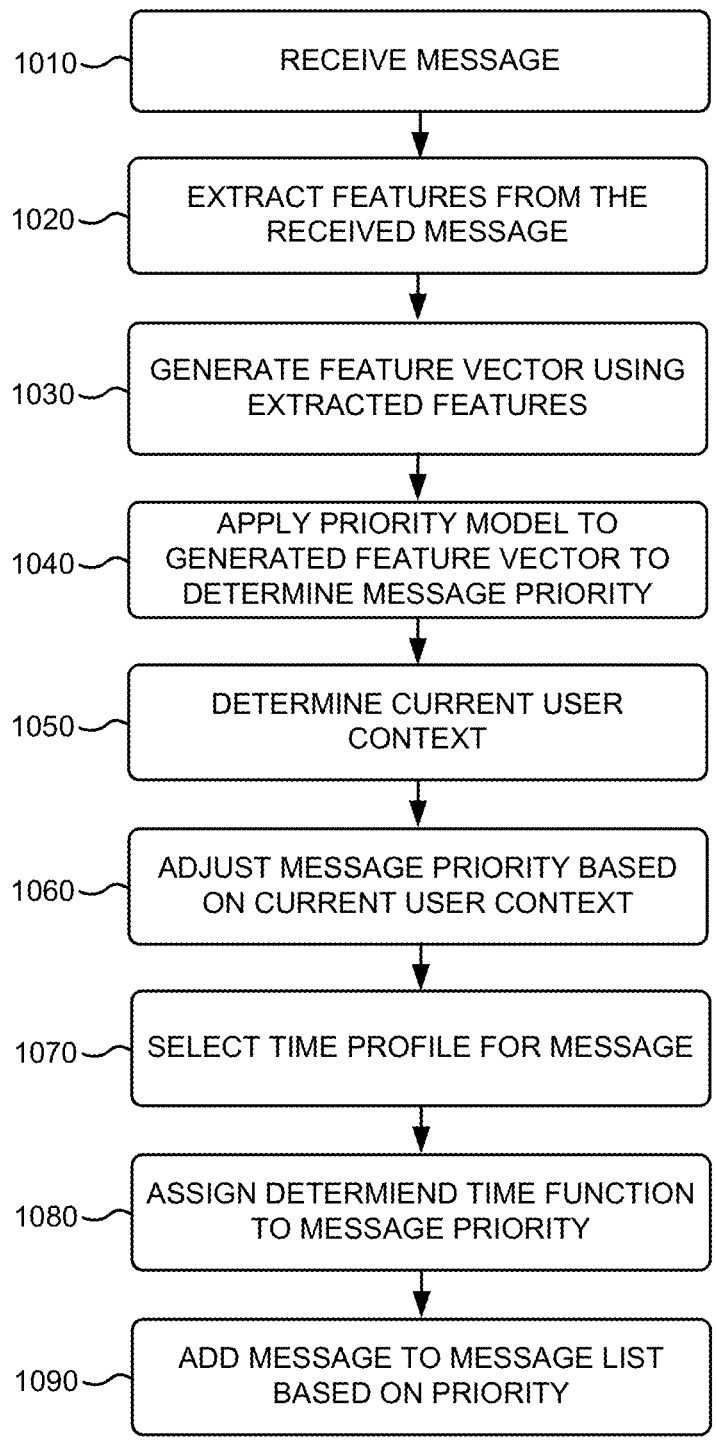
FIG. 10 is a flow chart of an exemplary process for determining a priority level associated with a message or feed according to an implementation described herein.

FIG. 10 is a flow chart of an exemplary process for determining a priority level associated with a message or feed according to an implementation described herein. In one implementation, the process of FIG. 10 may be performed by mobile communication device 110. In other implementations, some or all of the process of FIG. 10 may be performed by another device or a group of devices separate from prioritization service device 130 and/or including mobile communication device 110, such as, for example, prioritization service device 130.

The process of FIG. 10 may include receiving a message (block 1010). For example, mobile communication device 110 may receive a text message, an email message, a social media feed, or another type of message originated by another user. Features may be extracted from the received message (block 1020). In one implementation, feature extractor 450 of mobile communication device 110 may extract one or more features associated with the message, such as features relating to the other user that originated the message, features relating to the content of the message, or other features relating to the message, such as temporal information associated with the message. In another implementation, the message may be forwarded to prioritization server device 130 and features extractor 510 may extract features associated with the message. For example, features extractor 510 may use NER engine 520 and parts of speech tagger 530 to tag terms and/or phrases in the content of the message and may return the tagged content to mobile communication device 110.

In yet another implementation, some features may be extracted by features extractor 430 and other features may be extracted by features extractor 510. Which features are extracted by feature extractor 450 and which features are extracted by features extractor 510, and consequently how much information about the message is sent to prioritization server device 130, may be determined based on a privacy and speed setting, associated with message manager 401, that has been selected by the user.

A feature vector may be generated using the extracted features (block 1030). For example, the extracted features may be used to generate a feature vector for the message. A priority model may be applied to the generated feature vector to determine message priority (block 1040). For example, message prioritizer 460 of mobile communication device 110 (or, alternatively, message prioritizer 590 of prioritization server device 130) may use a model stored in model database 490 (or user models database 570) associated with the user to determine a priority level for the message based on the generated feature vector. For example, the model may determine an expected response time for the message and the expected response time may be associated with a priority level based on a priority function.

A current user context may be determined (block 1050). For example, context engine 440 may determine a current context associated with the user. For example, context engine 440 may determine whether the user is at work, at home, driving in a car, walking, riding a bike, using public transportation, and/or whether the user is associated with another context.

The message priority may be adjusted based on the current user context (block 1060). In one implementation, the determined message priority may be adjusted based on the current user context. For example, the priority level may be decreased if the user is associated with a first context and the contact from which the message was received is associated with a second context. For example, if the user is at home and receives a message from a co-worker, the priority level as determined by the model, may be reduced.

In another implementation, instead of adjusting a message priority based on the current user context, a particular user context may be associated with a particular model and message prioritizer 460 may select a particular model associated with the current user context. In yet another implementation, features associated with user context may be incorporated into the feature set used to determine the model and may be included as part of the feature vector when determining the priority level for a message.

If it is determined that the current context has changed, priority levels associated with messages may be re-adjusted. For example, if the user is at home and goes to work, priority levels of messages may be adjusted based on the work context.

A time profile for the message may be selected (block 1070) and the determined time function may be assigned to the message priority (block 1080). For example, time profile selector 480 may select a particular time profile for a message based on one or more features associated with the message. In one implementation, a priority level assigned to a message may not change over time. In another implementation, all messages may be assigned a same time profile. For example, all messages may be assigned time profile 801 and the priority levels assigned to messages may decay exponentially over time. In yet another implementation, a first message may be assigned a first time profile and a second message may be assigned a second time profile. For example, messages that do not include a named entity of a time type may be assigned time profile 801 and messages that do include a named entity of a time type may be assigned time profile 802. Thus, if the content of a message includes a specified time, the priority level of the message may increase as the specified time approaches and may decrease after the specified time has passed.

The message may be added to a message list based on priority (block 1090). For example, message prioritizer 460 may add the message to a message list based on the determined priority level. Messages associated with the same priority level may be arranged chronologically. The messages may be organized based on a message organization setting specified by the user. For example, the messages may be organized into separate lists based on message type, may be organized into separate lists based on contacts, and/or may be combined into a single message stream.

Figure 11:
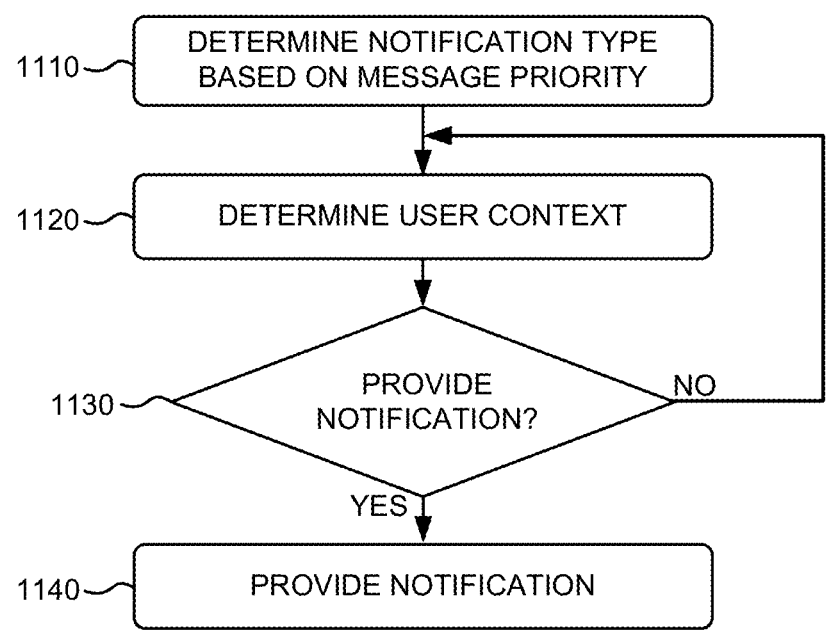
FIG. 11 is a flow chart of an exemplary process for providing a notification about a message or feed according to an implementation described herein.

FIG. 11 is a flow chart of an exemplary process for providing a notification about a message or feed according to an implementation described herein. In one implementation, the process of FIG. 11 may be performed by mobile communication device 110. In other implementations, some or all of the process of FIG. 11 may be performed by another device or a group of devices separate from mobile communication device 110 and/or including mobile communication device 110, such as, for example, prioritization service device 130.

The process of FIG. 11 may include determining a notification type based on message priority (block 1110). For example, notification manager 470 may determine a priority level associated with a message from message prioritizer 460 and may determine a notification type for the priority level by accessing settings memory 425.

User context may be determined (block 1120). For example, notification manager 470 may determine a current context from context engine 440 or by accessing current context field 610 of message database 460. A determination may be made as to whether to provide a notification (block 1130). Particular context may be associated with an instruction not to provide a notification about a received message of a particular priority type. As an example, if the user is associated with a driving context, no notifications may be provided while the user is driving. As another example, if the user is associated with a work context, notifications may only be provided when messages associated with a high priority level are received.

If it is determined that a notification is not to be provided (block 1130—NO), processing may return to block 1120 (e.g., to determine whether user context has changed). If it is determined that a notification is to be provided (block 1130—YES), a notification may be provided (block 1140). For example, notification manager 470 may activate a sound file associated with a particular priority level assigned to the received message.

Figure 12:
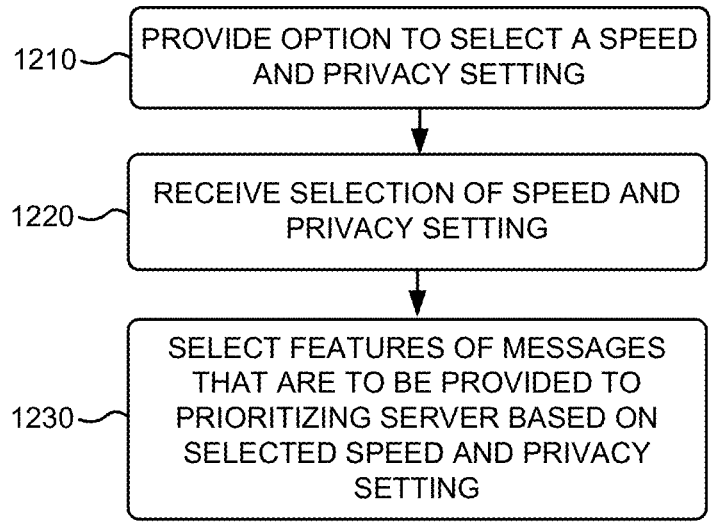
FIG. 12 is a flow chart of an exemplary process for selecting a privacy and speed setting for determining a priority level associated with a message or feed according to an implementation described herein.

FIG. 12 is a flow chart of an exemplary process for selecting a privacy and speed setting for determining a priority level associated with a message or feed according to an implementation described herein. In one implementation, the process of FIG. 12 may be performed by mobile communication device 110. In other implementations, some or all of the process of FIG. 12 may be performed by another device or a group of devices separate from mobile communication device 110 and/or including mobile communication device 110, such as, for example, prioritization service device 130.

The process of FIG. 12 may include providing an option to select a speed and privacy setting (block 1210). For example, a user may select a settings screen and user interface 420 may display a user interface that enables a user to select a speed and privacy setting for determining priority levels for messages. A selection of a speed and privacy setting may be received (block 1220). For example, the user may select a particular speed and privacy setting.

Features of messages that are to be provided to a prioritization server may be selected based on the selected speed and privacy setting (block 1230). There may be a tradeoff between privacy and speed in determining priority levels for messages. A low privacy setting may result in more information, about messages received by mobile communication device 130, being provided to prioritization server device 130 and may result in result in a high processing speed (e.g., prioritization server device 130 may process extracted features and/or information about a current context associated with a user faster than mobile communication device 110). Thus, for example if a lowest privacy setting is selected, all features extracted from a message, or the content of the message, may be provided to prioritization server device 130. As another example, a higher privacy setting may result in a message being processed for named entities and parts of speech by prioritization server device 110 and all other features of the message being processed by mobile communication device 110, resulting in a lower processing speed.

Figure 13:
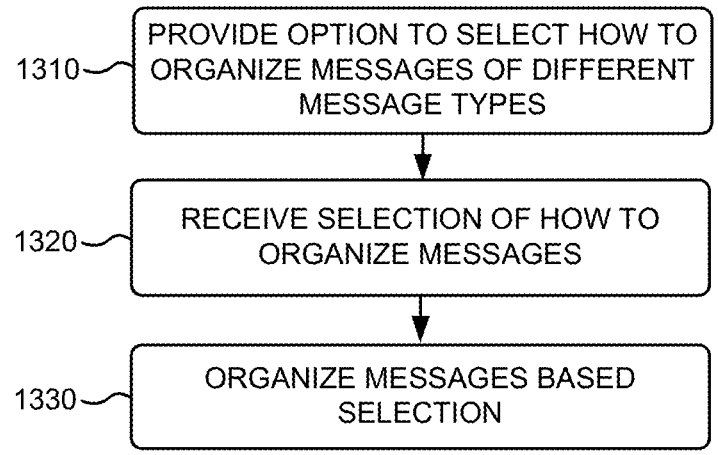
FIG. 13 is a flow chart of an exemplary process for selecting how to organize feeds according to an implementation described herein.

FIG. 13 is a flow chart of an exemplary process for selecting how to organize feeds according to an implementation described herein. In one implementation, the process of FIG. 13 may be performed by mobile communication device 110. In other implementations, some or all of the process of FIG. 13 may be performed by another device or a group of devices separate from mobile communication device 110 and/or including mobile communication device 110, such as, for example, prioritization service device 130.

The process of FIG. 13 may include providing an option to select how to organize messages of different message types (block 1310). For example, a user may select a settings screen and user interface 420 may display a user interface that enables a user to select how to organize messages of different message types. The user may be provided with an option to organize messages of different message types based on contacts associated with the messages, may be provided with an option to organize messages of different message types based on message type, and/or may be provided with an option to combine messages of different message types into a combined message stream.

A selection of how to organize messages may be received (block 1320). For example, the user may select a particular option of organizing messages of different message types. Messages may be organized based on the received selection (block 1330). As an example, if the user selects to organize messages based on contacts, messages associated with each contact may be put into a list of messages received from the contact and may be ranked in the list based on the priority levels assigned to the messages. As another example, if the user selects to organize messages based on message type, messages associated with each message type may be put into a list of messages of a particular message type and may be ranked in the list based on the priority levels assigned to the messages. As yet another example, if the user selects to combine messages into a single message stream, all messages received by mobile communication device 110 may be put into a single list of messages and may be ranked in the list based on the priority levels assigned to the messages.

FIG. 14A is a diagram of exemplary text messages 1401 tagged by NER engine 520 according to an implementation described herein. A text message of text messages 1401 may include a named entity 1410 of a person type, a named entity 1412 of a location type, a named entity 1414 of a time type, a named entity 1416 of an activity type, and a named entity 1418 of an object type.

FIG. 14B is a diagram of exemplary messages 1402 tagged with a parts of speech tagger 530 according to an implementation described herein. Words in exemplary messages 1402 may be tagged with parts of speech tags 1430. A part of speech tag 1430 may indicate whether a particular word corresponds to a noun, a pronoun, a verb, an adjective, an adverb, a conjunction, an interjection, or another type of part of speech.

Figure 15A:
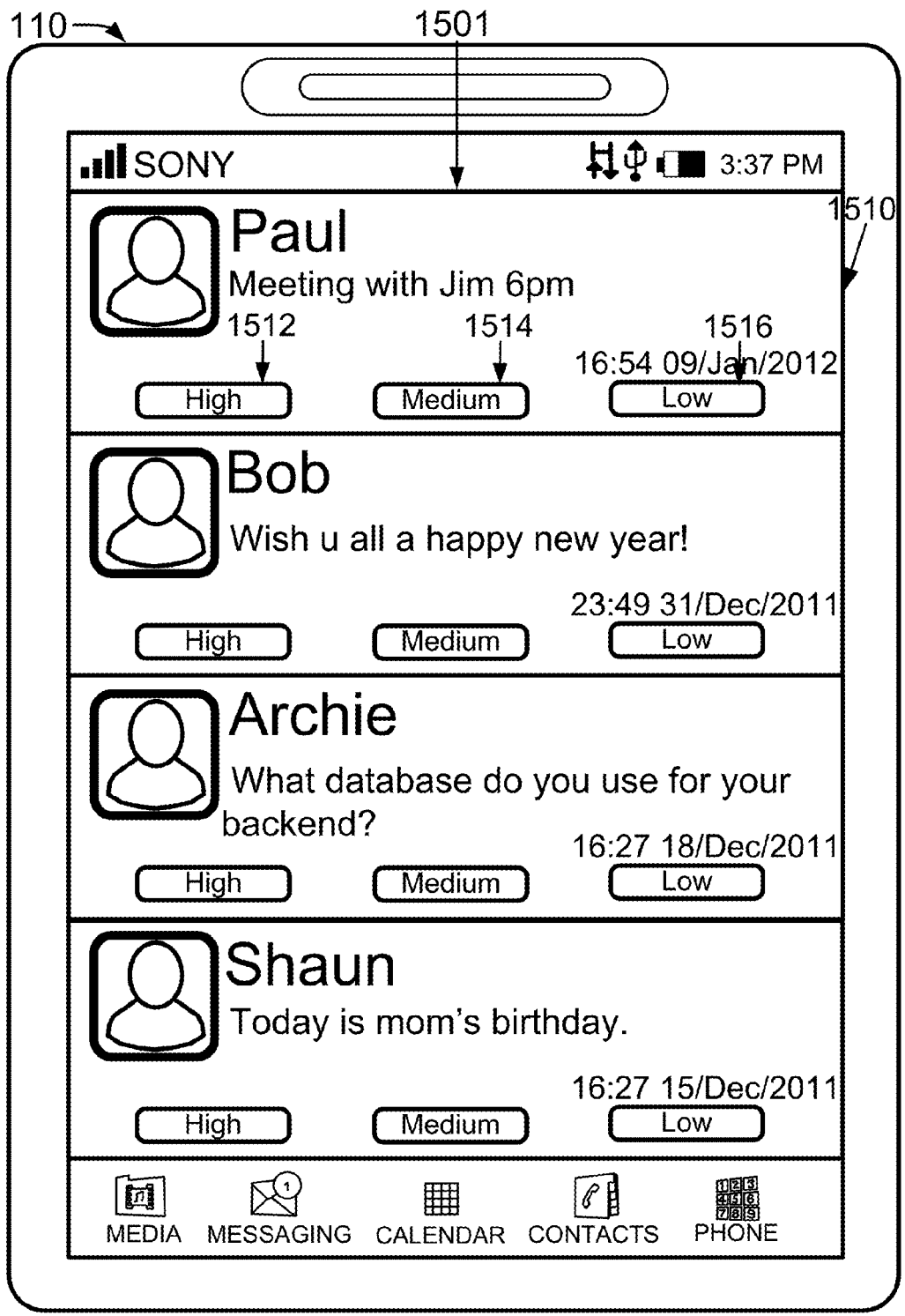
FIGS. 15A-15F are diagrams of exemplary user interfaces according to an implementation described herein.

FIGS. 15A-15F are diagrams of exemplary user interfaces according to an implementation described herein. FIG. 15A illustrates user interface 1501 that may be displayed by mobile communication device 110. User interface 1501 may include text messages 1510 along with an option to enable the user to manually label the text messages with a particular priority. For example, the user may be provided with an option to label text message 1510 with a high priority by selecting a high priority button 1512, may be provided with an option to label text message 1510 with a medium priority by selecting a medium priority button 1514, and/or may be provided with an option to label text message 1510 with a low priority by selecting a low priority button 1516. Enabling a user to manually label messages with a priority level may result in a more accurate model for the user.

Figure 15B:
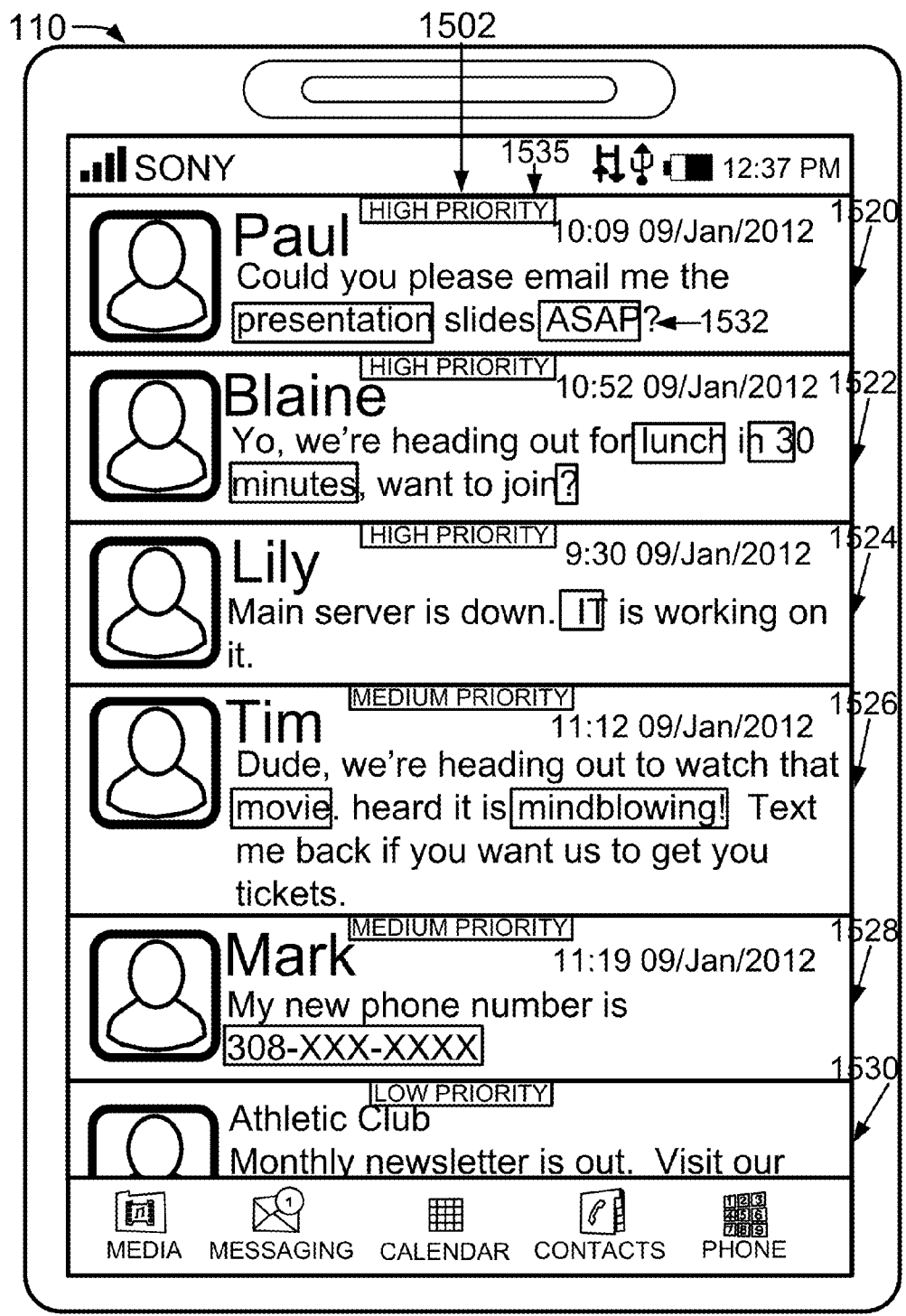

FIG. 15B illustrates user interface 1502 that may be displayed by mobile communication device 110. User interface 1502 may include a set of messages organized based on priority levels assigned to the messages according to a first context. For example, user interface 1502 may include a first text message 1520, a second text message 1522, a third text message 1524, a fourth text message 1526, a fifth text message 1528, and a sixth text message 1530. A text message may include a priority level indication 1535. For example, the context associated with user interface 1502 may correspond to a work context and first text message 1520, a second text message 1522, a third text message 1524 may be associated with a high priority because the contacts associated with first text message 1520, a second text message 1522, a third text message 1524 may be associated with the work context. For example, the contacts associated with first text message 1520, a second text message 1522, a third text message 1524 may have only sent messages to the user when the user is associated with the work context (e.g., if the user is at his or her work location during normal working hours).

Fourth text message 1526 and a fifth text message 1528 may be associated with a medium priority level. For example, fourth text message 1526 may be associated with a medium priority level because the content of fourth text message 1526 may include features which are associated with a lower priority level in relation to the work context. Fifth text message 1528 may be associated with a medium priority level because messages from the contact associated with fifth text message 1528 have been received in the past during a time period that is associated with a different context (e.g., a home context). Sixth text message 1530 may be associated with a low priority level because the user has never responded to messages received from the contact associated with sixth text message 1530.

User interface 1502 may further include highlighted terms 1532. A term in a message may be highlighted if the term is associated with a feature that had a significant effect on the determined priority level assigned to the message. For example, named entities may be highlighted.

Figure 15C:
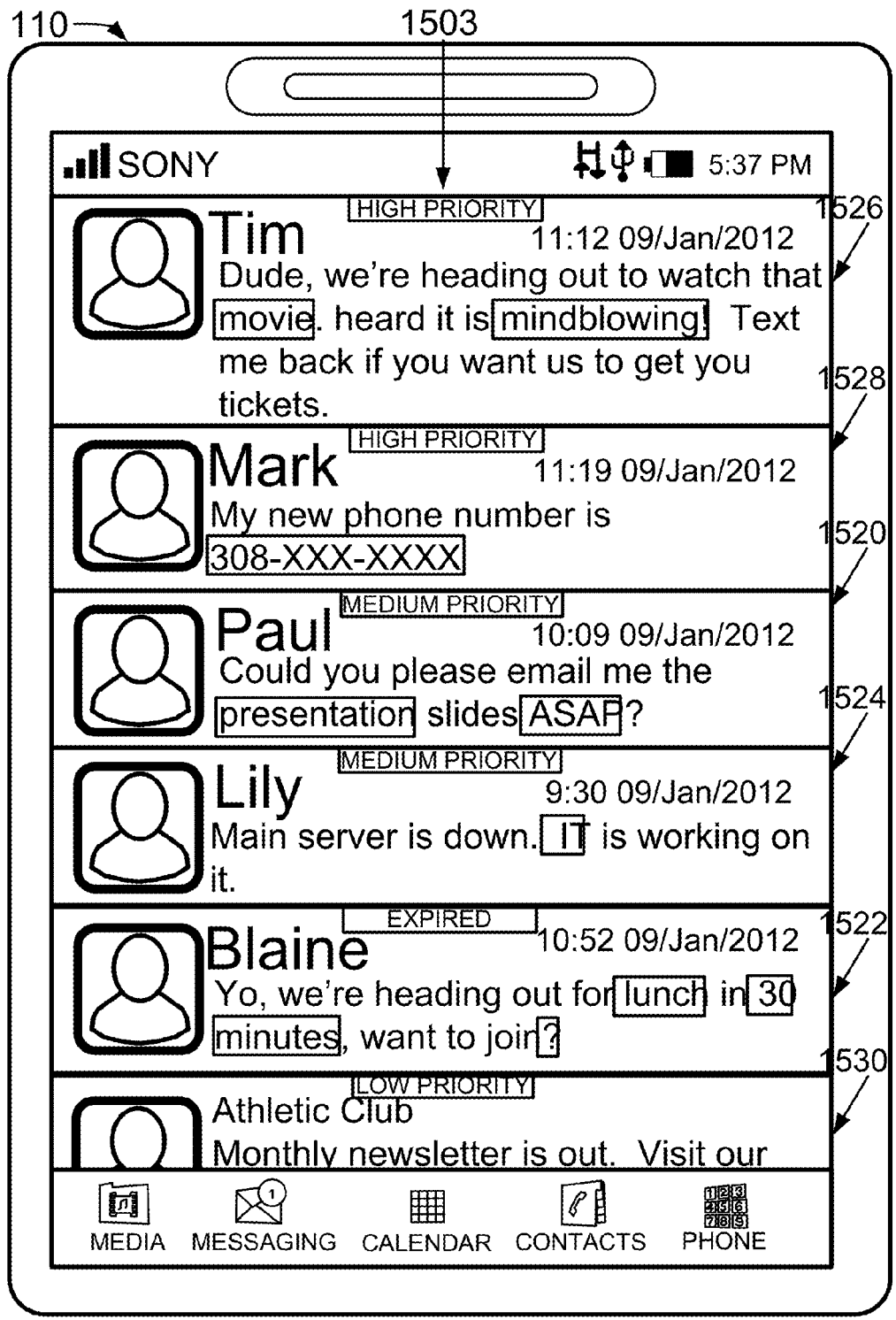

FIG. 15C illustrates user interface 1503 that may be displayed by mobile communication device 110. User interface 1503 may include the set of messages re-organized based on a second context. The second context may correspond to a home context. In user interface 1503, fourth text message 1526 and fifth text message 1528 may be associated with a high priority; first text message 1520, third text message 1524, and second text message 1522 may be associated with a medium priority level; and sixth text message 1530 may continue to be associated with a low priority level.

Figure 15D:
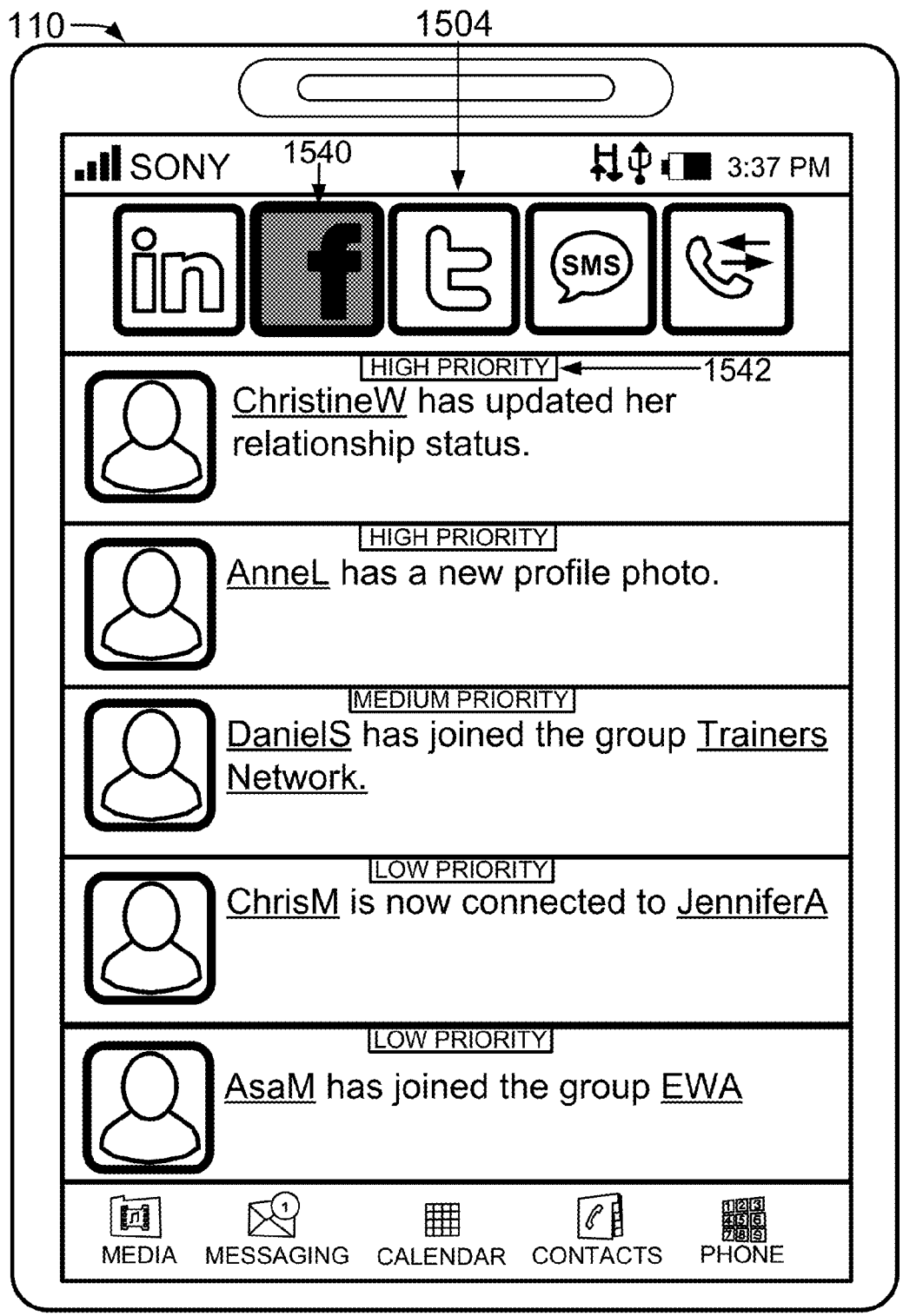

FIG. 15D illustrates user interface 1504 that may be displayed by mobile communication device 110. User interface 1504 may include messages organized by message type. User interface 1504 may include a set of message type buttons 1540. For example, message type buttons 1540 may include a LinkedIn button to view LinkedIn updates received by mobile communication device 110, a Facebook button to view Facebook updates received by mobile communication device 110, a Twitter button to view Twitter messages received by mobile communication device 110, an SMS button to view text messages received by mobile communication device 110, and a call button to view calls received by mobile communication device 110.

A user may select to view messages of a particular type by selecting message type button 1540 associated with the particular type. For example, the user may select the Facebook button and view Facebook updates received by the user organized based on priority levels assigned to the Facebook updates. Each particular Facebook update may include a priority level indication 1542 that indicates the priority level assigned to the particular Facebook update.

Figure 15E:
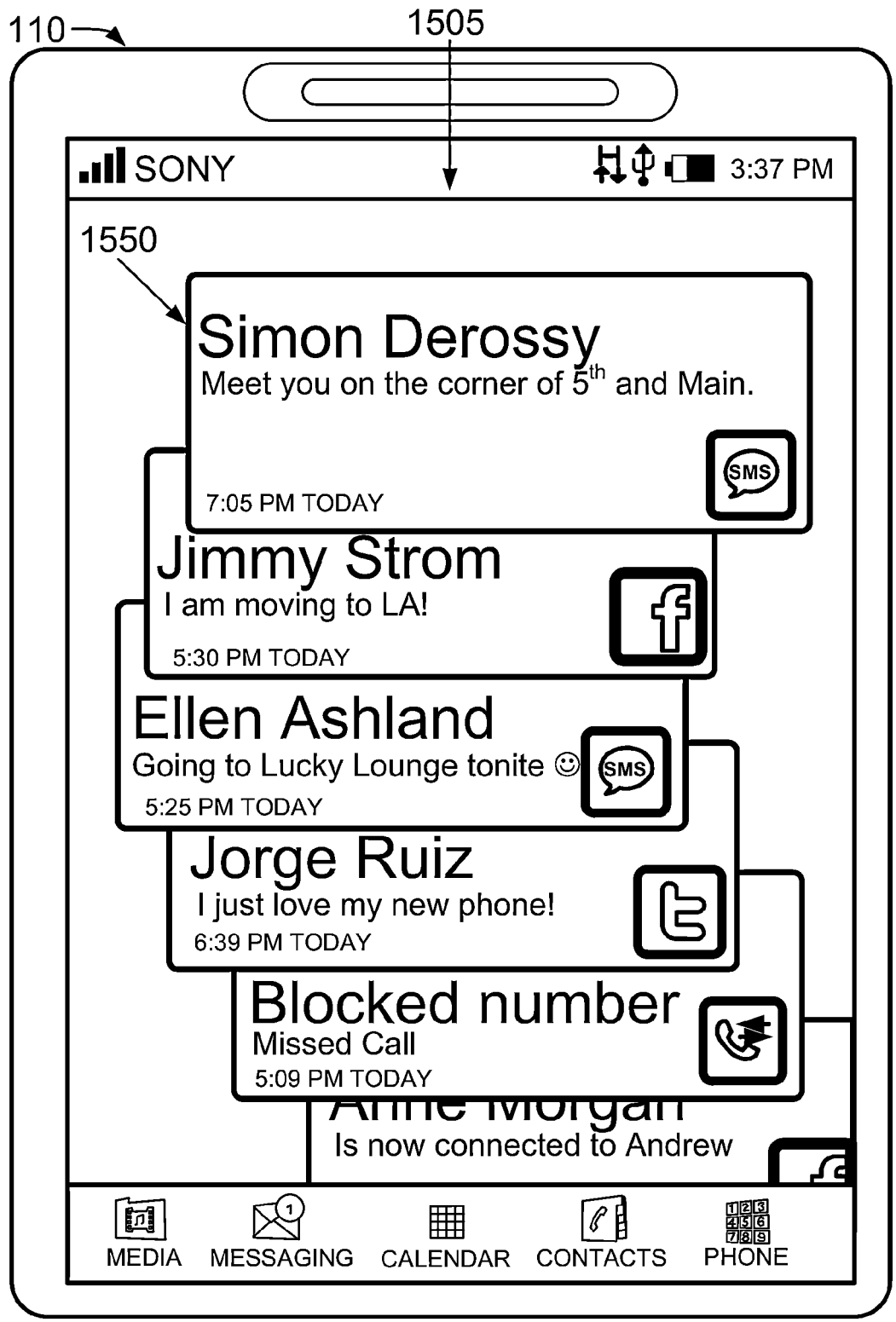

FIG. 15E illustrates user interface 1505 that may be displayed by mobile communication device 110. User interface 1505 may include messages of different message types combined into a combined messages list 1550 based on priority levels assigned to the messages. For example, combined messages list 1550 may include a text message positioned first, followed by a Facebook update, followed by another text message, followed by a Twitter message, followed by an indication of a missed call.

Figure 15F:
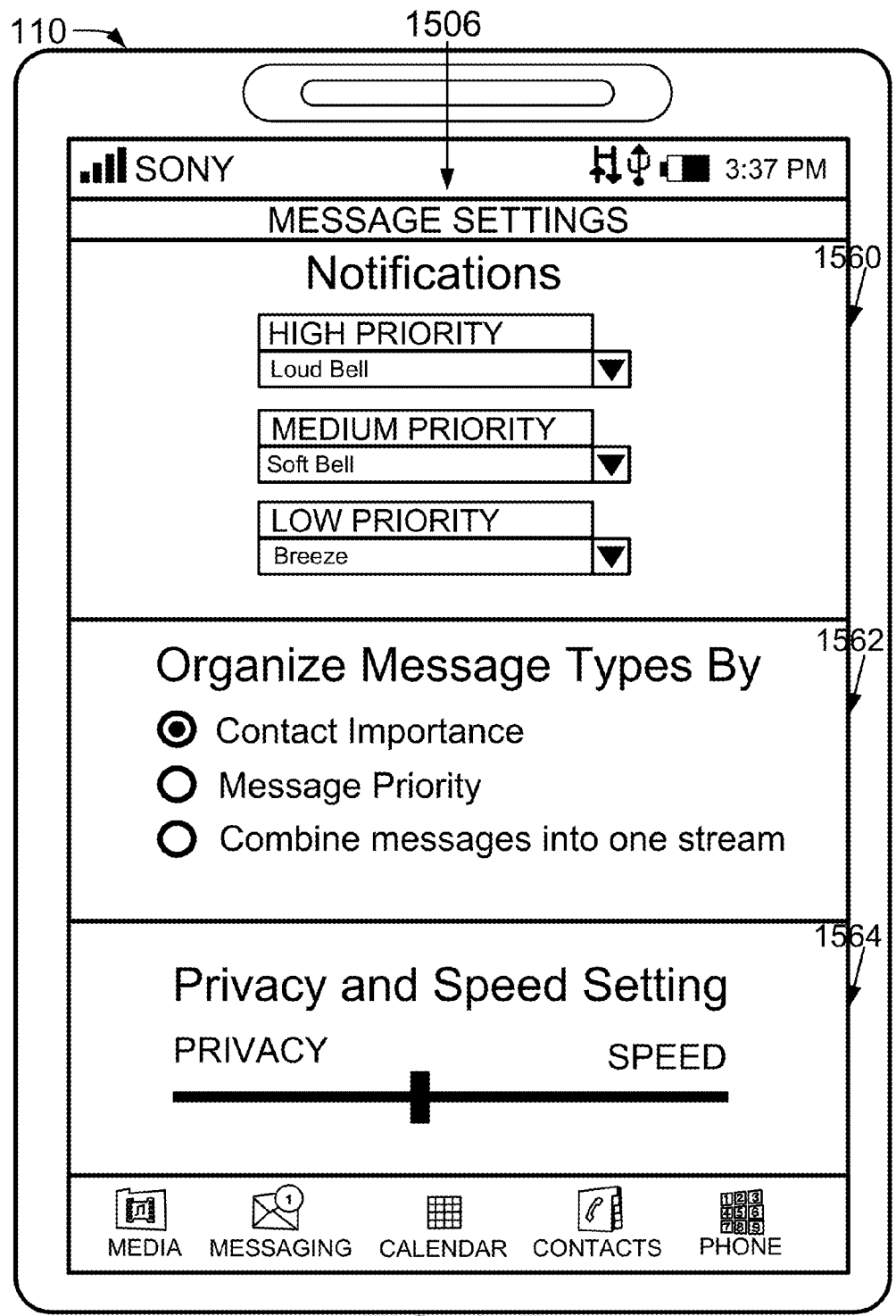

FIG. 15F illustrates user interface 1506 that may be displayed by mobile communication device 110. User interface 1506 may include a message settings menu that may include a notifications settings section 1560, a message types organization section 1562, and a privacy and speed settings section 1564.

Notifications setting section 1560 may enable a user to select a particular notification for each priority level. For example, a user may select a first audio file to play as a notification when a high priority message is received, may select a second audio file to play as a notification when a medium priority message is received, and may select a third audio file to play as a notification when a low priority message is received.

Message types organization section 1562 may enable a user to select how to organize messages of different message types. For example, a user may select to organize messages by contacts (e.g., messages of different types from a same contact may be put into a list of messages associated with the contact), may select to organize messages by message type, or may select to combine messages into a combined message stream.

Privacy and speed settings section 1564 may enable a user to select a privacy and speed setting. There may be a tradeoff between privacy and speed in determining priority levels for messages. A low privacy setting may result in more information, about messages received by mobile communication device 110, being provided to prioritization server device 130 and may result in result in a high processing speed (e.g., prioritization server device 130 may process extracted features and/or information about a current context associated with a user faster than mobile communication device 110). A high privacy setting may result in less information, about messages received by mobile communication device 110, being provided to prioritization server device 130 and may result in result in a low processing speed.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 9-13, the order of the blocks may be modified in other implementations. Further, non-dependent blocks may be performed in parallel.

Furthermore, while particular processes, or particular blocks of process, described with respect to FIGS. 9-13 are described as being performed by prioritization server 130, in another implementation, all processes described with respect to FIGS. 9-13 may be performed by mobile communication device 110 and prioritization server device 130 may not be needed.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, comprising:
    extracting, by the computer device, one or more features from messages received by a mobile communication device;
    obtaining, by the computer device, information about a user context associated with a user of the mobile communication device;
    obtaining, by the computer device, information about one or more user actions associated with the messages, wherein the information includes information about a response time associated with a particular message, wherein the response time corresponds to an amount of time between when the user received the particular message and when the user responded to the particular message;
    generating, by the computer device, a priority function that relates a particular response time to a particular priority level, wherein generating the priority function includes:
        determining a mean response time for the messages;
        associating a medium priority level, for the priority function, with response times within a standard deviation of the mean response time;
        associating a high priority level, for the priority function, with response times shorter than the response times within the standard deviation of the mean response time; and
        associating a low priority level, for the priority function, with response times longer than the response times within the standard deviation of the mean response time;
    generating, by the computer device, a model associated with the user, wherein the model relates the extracted one or more features to a priority level based on the obtained information about the one or more user actions, based on the obtained information about the user context, and based on the generated priority function; and
    using, by the computer device, the generated model to determine a priority level for a message received by the mobile communication device.

2. The method of claim 1, wherein the extracted one or more features include one or more of:
    information about a contact associated with a particular message, or
    information about a content included in the particular message.

3. The method of claim 2, wherein the information about the content included in the particular message includes one or more of:
    information identifying parts of speech included in the particular message,
    information identifying named entities included in the particular message,
    information identifying particular characters included in the particular message, or
    information identifying a header associated with the particular message.

4. The method of claim 1, wherein the information about one or more user actions associated with the messages further includes one or more of:
    information identifying how long the user viewed a particular message,
    information identifying whether the user deleted the particular message,
    information identifying whether the user labeled the particular message with a particular label, or
    information identifying whether the user moved the particular message to a particular folder.

5. The method of claim 1, wherein the information about the user context associated with the messages includes one or more of:
    information about whether the mobile communication device is associated with continuous motion, or
    information about whether the mobile communication device is associated with stop-and-go motion.

6. The method of claim 1, wherein the messages include one or more of a short message format message, an instant message, a telephone message, an email message, or a social media feed.

7. The method of claim 1, wherein generating the model associated with the user includes:
    generating a first model for a first type of message received by the mobile communication device;
    generating a second model for a second type of message based on the generated first model; and
    using the generated second model to determine a priority level for a particular second type of message received by the mobile communication device.

8. A method performed by a mobile communication device, the method comprising:
    receiving, by the mobile communication device, a message;
    extracting, by the mobile communication device, one or more features associated with the message;
    determining, by the mobile communication device, a priority level for the message, based on the extracted one or more features, using a model that relates the extracted one or more features to an expected response time for the message, wherein the model is generated by a process that includes:
determining a mean response time for messages received by the mobile communication device over a period of time;
associating a medium priority level for messages with response times within a standard deviation of the mean response time;
associating a high priority level for messages with response times shorter than the response times within the standard deviation of the mean response time; and
associating a low priority level for messages with response times longer than the response times within the standard deviation of the mean response time;
determining, by the mobile communication device, a context associated with a user of the mobile communication device;
modifying, by the mobile communication device, the priority level based on the determined context; and
providing, by the mobile communication device, the message to a list of messages based on the modified priority level.

9. The method of claim 8, wherein one or more features associated with the message include one or more of:
information about a contact associated with the message,
information about parts of speech included in the message,
information about named entities included in the message,
information about particular characters included in the message,
information about a header associated with the message, or
information about when the message was received.

10. The method of claim 8, further comprising:
selecting a time profile for the message based on the extracted one or more features; and
changing the priority level over time based on the selected time profile.

11. The method of claim 8, further comprising:
determining a particular notification for the message based on the determined priority level and based on the determined context;
determining whether to provide the particular notification based on the determined context; and
providing the particular notification via an output device of the mobile communication device, in response to determining that the particular notification is to be provided.

12. The method of claim 8, further comprising:
receiving, from the user, a selection of a speed and privacy setting for determining priority levels for messages; and
selecting one or more of the extracted one or more features to send to a prioritization server device, to determine the priority level for the message, based on the received selection of the privacy and speed setting.

13. The method of claim 8, further comprising:
receiving, from the user, a selection of at least one criterion to use to organize different types of messages, wherein the criterion includes at least one of:
organizing the different types of messages based on contacts associated with the different types of messages,
organizing the different types of messages based on a type of message associated with the different types of messages, or
combining the different types of messages into a single list.

14. The method of claim 8, wherein the message includes a short message format message, an instant message, a telephone message, an email message, or a social media feed.

15. A mobile communication device comprising:
logic configured to:
receive a message;
extract one or more features associated with the message;
determine a priority level for the message, based on the extracted one or more features, using a model that relates the extracted one or more features to an expected response time for the message, wherein the model includes logic configured to:
determine a mean response time for messages received over a period of time;
associate a medium priority level for messages with response times within a standard deviation of the mean response time;
associate a high priority level for messages with response times shorter than the response times within the standard deviation of the mean response time; and
associate a low priority level for messages with response times longer than the response times within the standard deviation of the mean response time;
determine a context associated with a user of the mobile communication device;
modify the priority level based on the determined context; and
include the message in a list of messages based on the modified priority level.

16. The mobile communication device of claim 15, wherein the logic is further configured to:
determine whether a feature associated with the message is associated with the determined context; and
lower the priority level in response to determining that the feature associated with the message is not associated with the determined context.

17. The mobile communication device of claim 15, wherein the logic is further configured to:
select a time profile for the message based on the extracted one or more features; and
change the priority level over time based on the selected time profile.

18. The mobile communication device of claim 15, wherein the logic is further configured to:
determine a particular notification for the message based on the determined priority level and based on the determined context;
determine whether to provide the particular notification based on the determined context; and
provide the particular notification via an output device of the mobile communication device, in response to determining that the particular notification is to be provided.

19. The mobile communication device of claim 15, wherein the logic is further configured to:
receive, from the user, a selection of a speed and privacy setting for determining priority levels for messages; and
select one or more of the extracted one or more features to send to a prioritization server device, to determine the priority level for the message, based on the received selection of the privacy and speed setting.

* * * * *